United States Patent [19]

Kossiakoff

[11] 4,315,315

[45] Feb. 9, 1982

[54] GRAPHICAL AUTOMATIC PROGRAMMING

[75] Inventor: Alexander Kossiakoff, Brookville, Md.

[73] Assignee: The Johns Hopkins University, Baltimore, Md.

[21] Appl. No.: 122,494

[22] Filed: Mar. 9, 1971

[51] Int. Cl.³ .............................................. G06F 15/20
[52] U.S. Cl. .................................... 364/300; 364/456; 364/516
[58] Field of Search ................... 235/150; 444/1, 352, 444/422, 671, 74, 34, 29; 340/172.5; 364/300, 900, 200, 578, 456, 516

[56] References Cited

U.S. PATENT DOCUMENTS 3,533,086 10/1970 Goetz .............................. 340/172.5

OTHER PUBLICATIONS

"Graphic Language Translation With a Language Independent Processor", 1967 Fall Joint Computer Conference, vol. 31, Morrison, Ronald A., G. E. Col, Cincinnati, Ohio, pp. 723-731.
"Dialog: A Conversational Programming System with a Graphical Orientation", CA CM-A, Communications of ACM, vol. 10, Issue 6, Jun. 67, Cameron, Scott H., Ewing, Duncan, Liveright, Michael, IIT Research Inst., Chicago, Ill., pp. 349-357.

Primary Examiner—Edward J. Wise
Attorney, Agent, or Firm—Robert E. Archibald; John S. Lacey

[57] ABSTRACT

Invention involves a process for automatically producing a computer program in machine assembly language directly from a two-dimensional network representing the flow of data and control logic which it is desired to accomplish on a specified general purpose digital computer. The network used to represent the desired data processing to be programmed involves a fundamentally new type of graphical representation, herein referred to as "data flow circuits". A specially defined "vocabulary" of some 50 basic data processing "data circuit elements" constitute the building blocks of data flow circuits. These elements on the one hand are functionally equivalent to hardware digital processing operations, and on the other hand are exactly defined as a set of computer instructions. The automatic preparation of a computer program by this method is especially advantageous when used with a computer-driven graphics terminal which provides for rapid and interactive configuration of the data flow circuit, on-line testing and immediate output of the final computer program.

34 Claims, 14 Drawing Figures

TARGET COORDINATE COMPUTATION CIRCUIT

```
0184                                        -INPUTS-
0185                         (HIT) = T(1) DELTA E(3) A(3) O(3) DELTA R(6)
0186                         (TD41)=ADDRESS OF ITEM IN TD STORE WITH FORMAT
0187                                  M(1) N(3) A(3) O(3) DELTA R(6)
0188                         (TD51)=ADDRESS OF ITEM IN TD STORE        WITH FORMAT B(10) E(6)
0189                         (BGEL)=BRNG AND ELEV. ASSOCIATED WITH (HIT). FORMAT B(10) E(6)
0190
0191     003250 -0 02 00645     LDA*  TD51        WILL BE -1 IF NO ENTRY
0192     003251 140401          CMA
0193     003252 101040          SNZ
0194     003253  0 01 03323     JMP   HCE         NO PREVIOUS HIT ENTRY
0195                         COMPARE HIT WITH PREVIOUS ENTRY
0196     003254 -0 02 00644     LDA*  TD41
0197     003255  0 04 03407     STA   HCT4
0198     003256  0 03 03416     ANA   =|77        EXTRACT DELTA R FROM PREVIOUS ENTRY
0199     003257  0 04 03404     STA   HCT1
0200     003260  0 02 00612     LDA   HIT
0201     003261  0 03 03416     ANA   =|77        EXTRACT DELTA R FROM HIT
0202     003262  0 07 03404     SUB   HCT1
0203     003263 100400          SPL               SEE IF EQUAL UP TO LAST BIT
0204     003264 141407          TCA
0205     003265  0 03 03417     ANA   =|177776
0206     003266 100040          SZE
0207     003267  0 01 03403     JMP   MTE         NO, GO TO MULT. TARG. ROUTINE
0208     003270  0 02 00612     LDA   HIT         EXTRACT A FROM HIT
0209     003271  0 03 03420     ANA   =|7000
0210     003272  0 04 03404     STA   HCT1
0211     003273  0 02 03407     LDA   HCT4

0212     003274  0 03 03420     ANA   =|7000      EXTRACT A FROM PREV. ENTRY
0213     003275  0 11 03404     CAS   HCT1
0214     003276  0 01 03317     JMP   PHC2        A (PREV) G.T. A (HIT)
0215     003277  0 01 03330     JMP   HCA         EQUAL, GO TO AVERAGE COORDINATES
0216     003300  0 02 00612     LDA   HIT         INSERT HIT INTO CG TABLE
0217     003301  0 03 03421     ANA   =|7077      EXTRACT A AND DELTA R FROM HIT
0218     003302  0 04 03404     STA   HCT1
0219     003303  0 02 03407     LDA   HCT4
0220     003304  0 03 03422     ANA   =|170000    EXTRACT M AND N FROM ENTRY
0221     003305  0 06 03404     ADD   HCT1        COMBINE WITH HIT
0222     003306  0 06 03423     ADD   =|10000     ADVANCE N
0223     003307 -0 04 00644     STA*  TD41
0224                         FORM SECOND WORD OF CG ENTRY
0225     003310  0 02 00612  PHC1 LDA  HIT
0226     003311 141340          ICA               EXTRACT DELTA E FROM HIT
0227     003312 040574          ARS   4
0228     003313  0 03 03424     ANA   =|7
0229     003314  0 06 00602     ADD   BGEL        ADD RADAR COORDINATES    B(10)E(6)
0230     003315 -0 04 00645     STA*  TD51            STORE IN TD STORE
0231     003316 -0 01 03247     JMP*  PHC         RETURN
0232                         FOR A (PREV) G.T. A (HIT), ADVANCE N AND RETURN
0233     003317  0 02 03407  PHC2 LDA  HCT4
0234     003320  0 06 03423     ADD   =|10000
0235     003321 -0 04 00644     STA*  TD41
0236     003322 -0 01 03247     JMP*  PHC
0237                         NO PREVIOUS ENTRY
0238     003323  0 02 00612  HCE  LDA  HIT
0239     003324  0 03 03421     ANA   =|7077      EXTRACT A AND DELTA R FROM HIT
0240     003325  0 06 03423     ADD   =|10000     SET N=1
0241     003326 -0 04 00644     STA*  TD41        STORE IN TD TABLE
0242     003327  0 01 03310     JMP   PHC1
0243                         HIT COORDINATE AVERAGING (EQUAL AMPLITUDES)
0244                         BEFORE COMPUTING AVERAGE BEARING, SEE IF NEW
0245                         HIT AND PREV. ENTRY ARE ON OPPOSITE SIDES OF NORTH
0246     003330  0 02 00602  HCA  LDA  BGEL
0247     003331 040476          LGR   2
0248     003332  0 03 03425     ANA   =|77760
0249     003333  0 04 03404     STA   HCT1        BEARING OF NEW HIT
0250     003334 -0 02 00645     LDA*  TD51
0251     003335 040476          LGR   2
```

*FIG. 1a*

| | | | | | | |
|---|---|---|---|---|---|---|
| 0252 | 003336 | 0 03 03425 | | ANA | =177760 | BEARING OF PREV. ENTRY |
| 0253 | 003337 | 0 04 03405 | | STA | HCT2 | |
| 0254 | 003340 | 0 06 03404 | | ADD | HCT1 | |
| 0255 | 003341 | 0 04 03406 | | STA | HCT3 | SUM OF BEARINGS |
| 0256 | 003342 | 0 07 03404 | | SUB | HCT1 | |
| 0257 | 003343 | 0 07 03404 | | SUB | HCT1 | DIFFERENCE OF BEARINGS |
| 0258 | 003344 | 100400 | | SPL | | |
| 0259 | 003345 | 141407 | | TCA | | ABS. VALUE OF DIFFERENCE |
| 0260 | 003346 | 0 11 03426 | | CAS | =100B9 | COMPARE DIFF. WITH PI |
| 0261 | 003347 | 0 01 03352 | | JMP | *+3 | OPPOSITE SIDES OF NORTH |
| 0262 | 003350 | 0 01 03352 | | JMP | *+2 | OPPOSITE |
| 0263 | 003351 | 0 01 03363 | | JMP | HCA3 | SAME SIDE OF NORTH |
| 0264 | 003352 | 0 02 03406 | | LDA | HCT3 | LOAD BEARING SUM |
| 0265 | 003353 | 0 11 03427 | | CAS | =201B9 | COMPARE WITH 2 PI |
| 0266 | 003354 | 0 01 03355 | | JMP | *+1 | AND ADD OR SUBTRACT 2 PI |
| 0267 | 003355 | 0 07 03430 | | SUB | =402B9 | AS NECESSARY. |
| 0268 | 003356 | 0 06 03427 | | ADD | =201B9 | |
| 0269 | 003357 | 0414 77 | HCA2 | LGL | 1 | SHIFT SO THAT RESULT IS DIVIDED |
| 0270 | 003360 | 0 03 03431 | | ANA | =1177700 | EXTRACT 10 BIT BEARING |
| 0271 | 003361 | 0 04 03404 | | STA | HCT1 | BY 2. |
| 0272 | 003362 | 0 01 03365 | | JMP | HCA4 | GO COMPUTE AVER. ELEVATION |
| 0273 | 003363 | 0 02 03406 | HCA3 | LDA | HCT3 | LOAD BEARING SUM |
| 0274 | 003364 | 0 01 03357 | | JMP | HCA2 | |
| 0275 | | | | | | |
| 0276 | | | | COMPUTE AVERAGE ELEVATION | | |
| 0277 | 003365 | 0 02 00612 | HCA4 | LDA | HIT | FIRST COMPUTE ELEV. OF NEW HIT |
| 0278 | 003366 | 141340 | | ICA | | |
| 0279 | 003367 | 0405 74 | | ARS | 4 | |
| 0280 | 003370 | 0 03 03424 | | ANA | =17 | EXTRACT DELTA E FROM HIT |
| 0281 | 003371 | 0 06 00602 | | ADD | BGEL | ADD GROUP ELEV. |
| 0282 | 003372 | 0 03 03416 | | ANA | =177 | |
| 0283 | 003373 | 0 04 03405 | | STA | HCT2 | |
| 0284 | 003374 | -0 02 00645 | | LDA* | TD51 | GET EL. OF PREV. ENTRY |
| 0285 | 003375 | 0 03 03416 | | ANA | =177 | |
| 0286 | 003376 | 0 06 03405 | | ADD | HCT2 | ADD EL. OF HIT |
| 0287 | 003377 | 0404 77 | | LGR | 1 | DIVIDE BY 2 |
| 0288 | 003400 | 0 06 03404 | | ADD | HCT1 | COMBINE WITH AVERAGE BEARING |
| 0289 | 003401 | -0 04 00645 | | STA* | TD51 | STORE COORDINATES IN TD STORE |
| 0290 | 003402 | 0 01 03317 | | JMP | PHC2 | |
| 0291 | | | | | | |
| 0292 | | | | | | |
| 0293 | 003403 | 000000 | MTE | HLT | | |
| 0294 | 003404 | | HCT1 | BSS | 1 | |
| 0295 | 003405 | | HCT2 | BSS | 1 | |
| 0296 | 003406 | | HCT3 | BSS | 1 | |
| 0297 | 003407 | | HCT4 | BSS | 1 | |
| 0298 | | | TD41 | EQU | 1644 | ADDRESS OF TD STORE WITH FORMATN(3)A(3)O(3)DR(6) |
| 0299 | | | TD51 | EQU | 1645 | ADDRESS OF TD STORE WITH FORMAT V  B(10) E(6) |
| 0300 | | | HIT | EQU | 1612 | |
| 0301 | | | BGEL | EQU | 1602 | |
| 0302 | | | | END | | |
| | 003410 | 000700 | | | | |
| | 003411 | 000010 | | | | |
| | 003412 | 003777 | | | | |
| | 003413 | 000030 | | | | |
| | 003414 | 014000 | | | | |
| | 003415 | 016000 | | | | |
| | 003416 | 000077 | | | | |
| | 003417 | 177776 | | | | |
| | 003420 | 007000 | | | | |
| | 003421 | 007077 | | | | |
| | 003422 | 170000 | | | | |
| | 003423 | 010000 | | | | |
| | 003424 | 000007 | | | | |
| | 003425 | 077760 | | | | |
| | 003426 | 014400 | | | | |
| | 003427 | 031100 | | | | |
| | 003430 | 062200 | | | | |
| | 003431 | 177700 | | | | |

FIG. 1b

TARGET COORDINATE COMPUTATION CIRCUIT

EXAMPLES OF DATA CIRCUIT ELEMENTS

HIT SORTING LOGIC FLOW DIAGRAM

PARTIALLY COMPLETED CIRCUIT

COMPLETED CIRCUIT

SAMPLE CIRCUIT DISPLAYED ON THE IBM 2250 TERMINAL

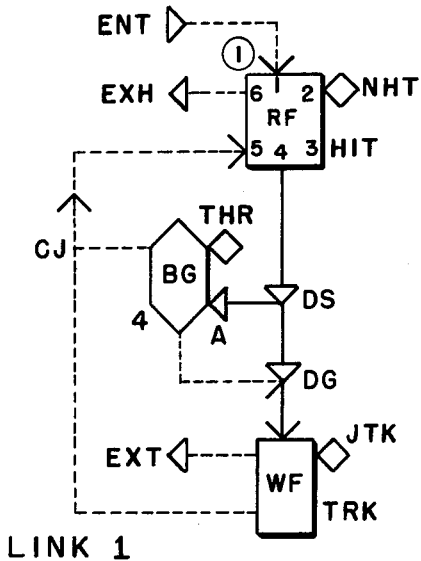

| LABEL | INSTRUCTION | | OUTPUTS |
|---|---|---|---|
| RF3 | DAC | HIT | |
| WF3 | DAC | TRK | |
| RF2 | DAC | NHT | |
| WF2 | DAC | JTK | |
| BG2 | DAC | THR | |
| RF6 | DAC | EXH | |
| WF6 | DAC | EXT | |
| RFI | DAC | ENT | C-RFI ① |
| RF5 | IRS | *RF2 | |
| | SKP | | |
| | JMP | *RF6 | C-RF6 |
| ① RFI | LDX | *RF2 | |
| | LDA | *RF3 | D-RF4 |

LINK 1

FIG. 6a

FIGS. 6a, 6b and 6c — HIT SORTING PROGRAM

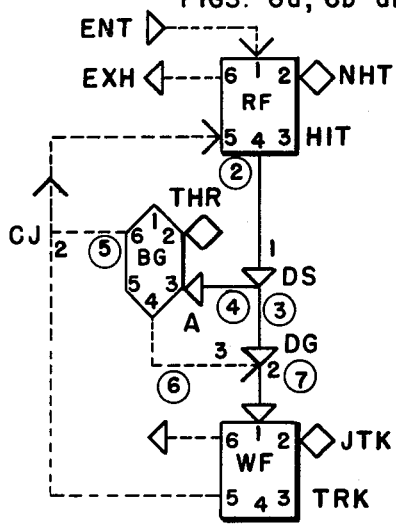

| LABEL | INSTRUCTION | | OUTPUTS |
|---|---|---|---|
| RF5 | IRS | *RF2 | |
| | SKP | | |
| | JMP | *RF6 | C-RF6 |
| RFI | LDX | *RF2 | |
| | LDA | *RF3 | D-RF4 ② |
| ② | STA | DSI | D-DS2 ④ |
| | | | D-DS3 ③ |
| ③ | ANA | BG3 | |
| | CAS | *BG2 | |
| | JMP | DG3 | |
| | JMP | DG3 | C-BG4 ⑥ |
| | JMP | CJI | C-BG6 ⑤ |
| ⑥ DG3 | LDA | DSI | C-DG2 ⑦ |
| ⑦ | LDX | *WF2 | |
| | STA | *WF3 | |
| | IRS | *WF2 | |
| | JMP | *CJ2 | C-WF5 |
| | JMP | WF6 | C-WF6 |

LINKS 2 TO 7

FIG. 6b

LINKS 8 TO 11

| LABEL | INSTRUCTION | | OUTPUTS |
|---|---|---|---|
| RFS | IRS | *RF2 | |
| | SEP | | |
| | JMP | *RF6 | C-RF6 (11) |
| RFI | LDX | *RF2 | |
| | LDA | *RF3 | |
| | STA | DSI | |
| | ANA | BG3 | |
| | CAS | BG2 | |
| | JMP | DG3 | |
| | JMP | DG3 | |
| | JMP | RF5 | |
| DG3 | LDA | DSI | |
| | LDX | *WF2 | |
| | STA | *WF3 | |
| | IRS | *WF2 | |
| | JMP | RF5 | C-WF5 (9) |
| | JMP | *WF6 | C-WF6 (8) |
| | | | C-RF5 (10) |
| BG3 | DEC | MKA | |

HIT SORTING PROGRAM BLOCK

TRACK PREDICTION MODULE

PROGRAM MODULE

GRAPHICAL AUTOMATIC PROGRAMMING

The invention herein described was made in the course of or under a contract or subcontract thereunder, with the Department of the Navy.

BACKGROUND OF THE INVENTION

The development, proofing, documentation and maintenance of computer programs for complex data-processing systems represents a difficult and increasingly costly aspect of modern systems design, especially for those systems requiring real-time processing. The problem is aggravated by the absence of a lucid means of representing the operations performed by the program or its internal and external interfaces and the associated communication gap between engineers and programmers.

General purpose digital computers have been applied with great success to problems in scientific and engineering analysis requiring highly complex mathematical calculations, and for economically storing large masses of data sorted in a way that permits almost instantaneous retrieval of a particular set of data. A third application of great importance has been the automation of operating systems.

The problems associated with these three applications of general purpose digital computers are fundamentally very different. A computer as a high speed mathematical calculator involves the transformation of a set of given parameters by a sequence of specific mathematical transformations into one or a set of solutions. The storage and retrieval of data involves the organization of a filing system with suitable indexing to facilitate rapid location of the data to be retrieved. In the use of a computer to automate portions of a complex system the primary processes are the correlation and classification of data inputs, recognition of significant events or changes in input conditions to the system, and translation of these into concise information outputs or actual control signals to external devices.

The design of computer programs for using digital computers for automating real-time operating systems has turned out to be quite different and much more difficult than designing programs for computing and data-handling applications. Thus, the enormous potential impact of the use of modern digital computers in automating such systems has been impeded by the very large expenditure of manpower, and hence of time and money, in the design of satisfactory large-scale computer programs. In many instances the development of the so-called "software" (in contrast to the "hardware", or equipment) is widely regarded as the limiting factor in both time and cost of system development.

The main task in effectively using a general-purpose computer in a given application is the development of a satisfactory computer program. Since the individual operations of the central processing unit are very elementary, a relatively long sequence of instructions must be written to accomplish most data-processing tasks. Accordingly, since the program in assembly code requires a separate instruction for each elementary machine instruction, it is very laborious to use in designing complex programs. For this reason several "programming languages" have been developed which enable the programmer to write concise "higher level" instructions. This involves development of a program called a "compiler", which translates the high-level instructions into the assembly code for a given computer. Since much of the detailed housekeeping is done by the compiler, the programmer's task is greatly facilitated.

While existing high level languages are very helpful in programming computers for use in mathematical analysis and business applications, they do not lend themselves to the design of real-time programs for complex automated systems. In such applications the program has to provide for accessing and outputting data at times required by the system timing, and must have a system of priorities which interrupts lengthy operations in favor of those requiring immediate action. The higher level languages obscure the relation between the operation called for and the time required for its execution, and thus can inadvertently produce a program which later proves to require unacceptably long processing times. "Timing" in scientific or business programs generally only affects cost. In high-data-rate real-time systems timing may control success or failure.

Further, automated systems must often accommodate large variations in the volume and rate of data inputs and in their quality or noise content. The use of existing high level programming languages obscures the memory requirement for storing the program code and data. The resulting inefficient use of memory and time, by a factor as high as three, is often a limiting factor in data handling capacity. In such systems the use of assembly language is more satisfactory in insuring that the program meets all system requirements, despite the increased labor involved in the detailed coding. These characteristics make the design of computer programs for real-time systems vastly more difficult and tedious than the preparation of programs for batch-type computational tasks.

An even more basic difficulty in the preparation of computer programs for automated systems is the communication gap between the engineers and the programmers. The design specifications for the program are prepared by engineers to fit the characteristics of the data inputs and the rate and accuracy requirements of the processed outputs. At the time he has to prepare the specifications the engineer cannot estimate reliably the complexity of the program that will result. The programmer, in turn, has little discretion in altering the specifications to meet the limitations on computer capacity and processing times. Accordingly, the development of a computer program for an automated system often results in an oversized and unbalanced product after an inordinate expenditure of effort and time.

SUMMARY OF THE INVENTION

A major step toward the solution to the problems discussed hereinabove has been achieved by the present invention, which has for convenience been called Graphical Automatic Programming. The principal objectives of the invention are as follows:

An important object of this invention is to provide a new computer-independent representation of a process to be accomplished by a specified computer, and means for automatically transforming this representation by a second computer into a complete program, in the machine assembly language of the specified computer and without the use of any manual programming.

Another object is to provide a new representation of a process to be accomplished by a computer which makes highly visible by a graphical notation the processing and flow of individual data, as well as that of control logic developed by conditional branching, in a two-dimensional network which can be understood clearly by engineers, scientists and computer programmers, both as to functional behavior and logical structure.

Another object is to provide a new representation of a process to be accomplished by a specified computer which can be configured or any interactive computer-driven graphics terminal, and means for automatically transforming it on-line by the resident computer into the desired computer program.

Another object is to provide means for automatically transforming the subject representation on-line on any interactive remote computer terminal (graphic or alphanumeric) such that any inconsistencies in the representation are immediately called out and may be suitably modified and checked out on-line.

Another object is to provide a simple but powerful set of computer-independent building blocks called data circuit elements for representing a process to be accomplished by a computer, the blocks or elements being distinguished from one another by forms representing the class of function which they perform, and by symbols identifying the specific members of the class, or element and hence the particular junction which they accomplish.

Another object is to configure the said set of building blocks, or data circuit elements, so as to represent commonly used sets of operations typical of a general purpose digital computer, and thereby provide a direct and efficient translation (compiling) of each into a set of instructions in the assembly language of the specified computer on which the process is to be programmed, such that maximum economy may be obtained in core usage and running time by making optimum use of the specific repertoire of that particular computer.

Another object is to provide special linkage elements for the representation, which serve to link several subprograms, designed by one or many different persons, and which permit their automatic assembly into a total complex program, which can be tested on-line for interface compatibility of all logical and data inputs and outputs.

Another object is to provide the designer of a complex data processing system with a means for estimating at the outset the core usage and running time of each section of the process, by providing a representation whose building blocks have explicit values for the above functions in the specified computer, thus avoiding at the outset the construction of a program which exceeds the capacity of the specified computer, or which uses undue core capacity and time for low-priority operations.

Another object is to provide a new representation of the said process which is self-documenting, either in graphical or alphanumeric form, in a manner clearly understandable by either an engineer or programmer, making clearly visible the interfaces among sub-units, the branch points and the successive steps of handling each information input.

The four principal features of the present invention, designed to accomplish the above objectives, are summarized below:

1. Data Flow Circuit Language

The fundamental new concept which constitutes the essential basis of the method of the present invention is the representation of a computer program in a "language" consisting of circuit networks, called data flow circuits, which represent the processing to be done in a form directly analogous to diagrams used by engineers to lay our electronic circuits. Data flow circuits represent a "universal language" with a form familiar to engineers and at the same time directly translatable into computer programs. This representation focuses attention on the flow of identifiable data inputs, quantized in the form of digital words, through alternative paths or "branches" making up the total data processing network. The switching of data flow at the branch points of the network is done by control signals generated in accordance with required logic. These control signals are equivalent to "jump" instructions in the digital programs.

Data flow circuits are constructed of data processing "elements", called data circuit elements each of which represents an operation equivalent to the execution of a specific set of instructions in a general-purpose computer. These data circuit elements are configured by the designer into a two dimensional data flow circuit representing the data processing desired, as if they were equivalent hardware functional elements. The designer can also assembly and define special circuit elements for his own use.

The correspondence between the individual data circuit elements and actual computer instructions makes it possible for the designer to assess the approximate time for executing each circuit path and the total core required to store the instructions. This permits him to balance the performance requirements for accuracy and capacity against the "cost" in terms of memory and execution time during the initial design of the circuit. This capability can be of utmost importance in programming high-data-rate real-time systems, especially those having limited memory capacity.

The data flow circuit representation also serves as a particularly lucid form of documenting the final derived computer program, and can be configured into a form especially suited for showing the order in which the program executes the functions involved in the total data flow circuit, and for accomplishing modifications.

2. Application of Computer Graphics

The form of the data flow circuits and circuit elements is designed to be most conveniently represented on a computer-driven graphics terminal, so as to take advantage of the powerful interactive design capability of these devices, when available, to configure data flow circuits on-line. In this instance the data flow circuit is designed on the display by selecting the arranging prestored element and interconnection configurations, using a light pen, joystick, keyboard or other graphic aid, in a manner similar to that used in computer design of electronic circuits.

The display program stores the circuit description in an "element interconnection matrix" and a data "dictionary". This description is checked automatically and any inconsistencies in structure are immediately drawn to the designer's attention.

3. Transformation of Graphical into Logical Form

Once the element identity and interconnections have been entered into the computer via either a graphics terminal or alphanumeric entry, the computer then executes the Transformation Program. This program converts the data flow circuit automatically into an operational sequence, representing the sequential action of the circuit elements as they would be serially processed by the computer. In the next step the computer converts the operational sequence into computer assembly code for the computer driving the graphics terminal. The program logic is checked out by using sample inputs and examining the outputs. Errors or omissions can be corrected immediately by the designer by modifying the faulty connections or input conditions in the circuit.

4. Integration and Testing of Complex Programs

When checked out the circuit is assembled by the computer with other blocks of the total program. The result is again checked for proper operation. At any desired stage the individual circuits or their assemblies can be translated into the machine assembly code of the particular computer on which the operational program is to run, which can be fed directly into the assembly of the operational computer. Subsequent modifications to the program can be made by calling up the circuit to be altered, making the changes with the display terminal, and invoking a program to find and change other affected sections.

The principal object of the present invention, therefore, is to provide a graphical automatic programming method, by the use of which an entire complex computer program can be designed, documented and managed through the use of data circuit language by direct interaction between the systems engineer and the graphics terminal, with the result that system software may be produced at a fraction of the time and cost achievable by methods in use up to the present time.

BRIEF DESCRIPTION OF THE DRAWINGS

FIGS. 1a and 1b are views of the parts of a computer program representative of a practical example of prior art real-time programming for the automatic tracking of target returns from a three-dimensional search radar;

FIG. 6a is a diagram, with an accompanying chart, showing the first step of the transformation of a data circuit into computer instructions;

FIG. 6b is a diagram, with an accompanying chart, showing the next six steps of the transformation of the data circuit into computer instructions;

DETAILED DESCRIPTION OF THE INVENTION

Figure 2:
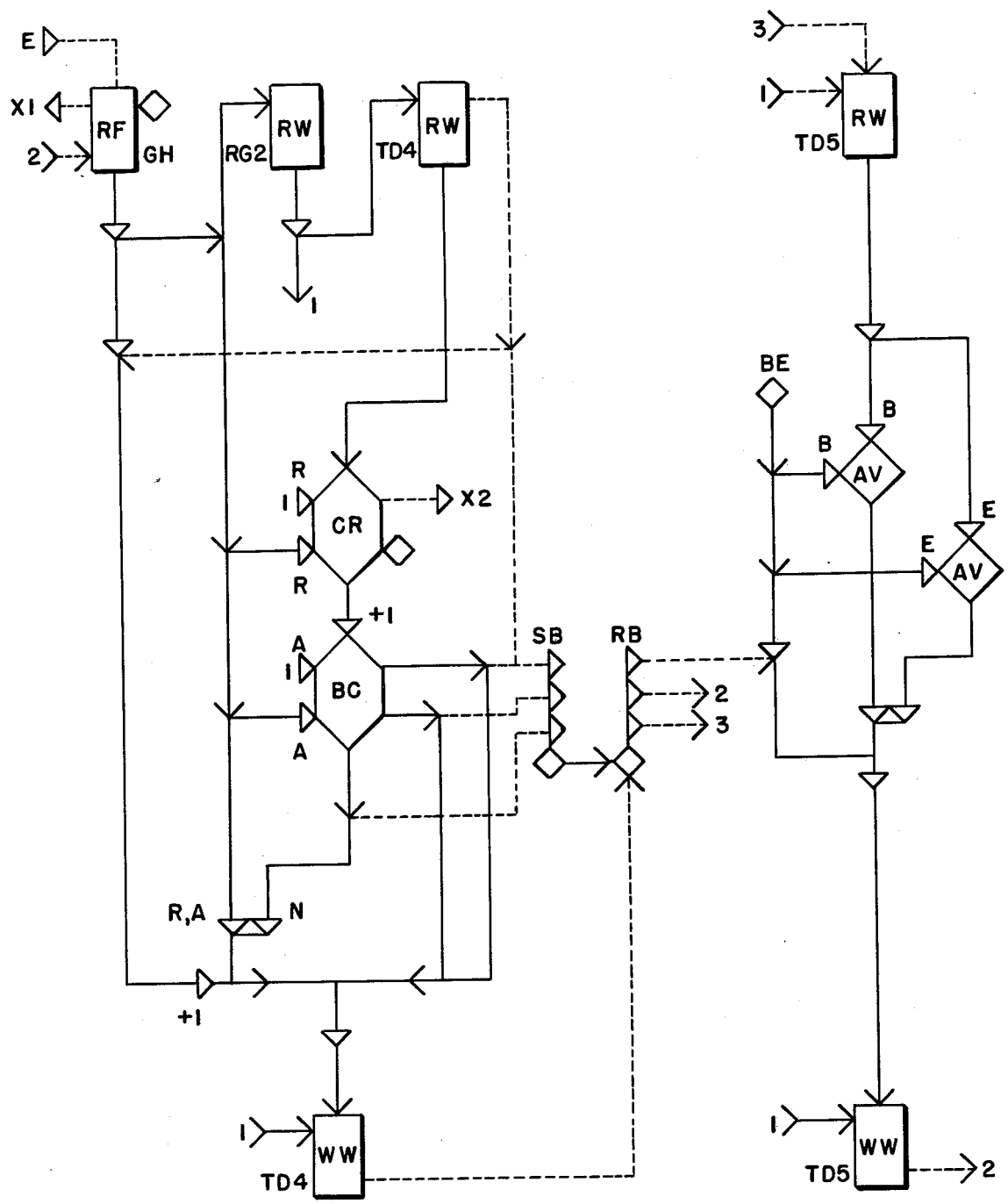
FIG. 2 is a diagram of the tracking process of FIG. 1 in the form of a data flow circuit according to the present invention.

Referring to the drawings, a prior art computer program representative of a practical example of real-time programming is shown in FIG. 1. It lists the code of one of the processes used in a program for automatic tracking of target returns from a three-dimensional search radar. This program was written for a Honeywell DP-516 computer, with a relatively simple but versatile set of instructions, such as is described in "Programmer Reference Manual DDP-516 General Purpose Computer", 1968, Honeywell Inc. 1300-71585A, and "DAP 16 Manual for DDP-116, DDP-416, DDP-516", 1966, Honeywell, Inc., 1300-716-29.

FIG. 1 shows both the computer machine code and the corresponding assembly code for each instruction. The machine code is listed in the columns of numbers on the left side of the figure and the equivalent assembly code is listed in the middle columns of characters. This same code will be used in the examples described hereinafter. The text at the right in the figure lists comments written by the programmer for his own reference in "debugging" or modifying the program. The program consists of some 100 instructions, and since it does not have an obvious form or structure, it is difficult to follow by anyone except the programmer who wrote it.

The representation of the same process in the form of a data flow circuit is shown in FIG. 2. In this view the solid lines represent the flow of data in the form of digital words and thus trace the successive operations on a given data input. The dashed lines represent control signals transmitted to gates which activate particular operations or data paths, and thus effect branching in the operational sequence.

In FIG. 2 the polygons represent the 12 main functional elements in the circuit. The shape of the element and the number and types of signal inputs and outputs indicate the general type of function it performs, while the characters inside define its specific operation. Thus, the visual configuration of the circuit is descriptive of its general operational function.

The routing of data and control signals among the different branches of a circuit is accomplished by a secondary class of elements represented by characteristic configurations of open and closed arrowheads. A closed arrowhead at an input to a functional element labeled by a letter indicates that the input is only the part of the data word which contains the variable represented by the label.

Some of the inherent advantages of using the data flow circuit representation for the programming of real time systems can be seen from a general comparison between FIGS. 1 and 2. The ability to follow the operations performed on each data input of FIG. 2 makes the interaction of different variables readily visible. The ease of representing branching at decision points and of tracing the resultant paths through the circuit network reveals possible logical traps to an engineer much more readily than the conventional logic flow diagram in which the path of data flow is not shown. It is easy to spot redundant operations, which can be combined.

Of equal significance is that each circuit element, when used in a given computer, has associated with it a definite set of instructions, except for minor variations depending on the form of the inputs, and hence the number of words in the Core (memory), and the time to execute, can be estimated quite closely at the outset. For example, it will be seen hereinafter that the BRANCH ON COMPARE element, designated in FIG. 2 by a hexagon marked by the characters "BC", requires four instructions for the conventional computer mentioned in connection with FIG. 1. In the present invention each signal routing element, in general, requires an average of one instruction, while the main functional elements require an average of six instructions, counting the preparation of data inputs. This knowledge gives the designer a measure of the size of the program equivalent to the circuit and the approximate transit time through any of the possible circuit paths. If either the size or time of the equivalent program appears excessive, the designer can seek to simplify the processing operations at the very outset so as to achieve a well balanced program.

A data flow circuit is conceptually equivalent to an actual circuit constructed from a multiplicity of special-purpose digital circuit elements. Digital circuits differ from analog circuits in that in the former the signals are "quantized" in the form of digital "words". This means that signal transformation and "flow" occur by a series of steps rather continuously. A data flow circuit differs from an ordinary digital circuit in that the steps are further restricted to take place one at a time to correspond to the sequence of operations by the computer. Thus, while data will flow in parallel paths in a circuit network such as that shown in FIG. 2, at any given instant signals will be flowing in only one of the paths (except for multi-processor computers). This characteristic does not detract from the high visibility of all of the interactions in the process inherent in the diagrammatic representation.

It should be understood that in a data flow circuit each functional element has a dual meaning. In the engineering representation it can be considered to be exactly equivalent to a hardware building block, which transforms indicated digital inputs into a uniquely defined set of output signals. In its representation of a sequence of operations performed by a general purpose digital computer, it corresponds to a definable set of instructions in computer assembly language.

In selecting the "building blocks" to be used as the functional elements of data flow circuits, each data circuit element was designed to meet the following criteria:

1. it must be sufficiently basic to have wide application in data processing systems.

2. It must be sufficiently powerful to save the designer from excessive detailing of secondary processes.

3. It must have a symbolic form which is simple to represent and meaningful in terms of its chracteristic function, but which will not be confused with existing component notation.

The choice and definition of the basic GAP (Graphical Automatic Programming Method) data circuit elements has evolved as a result of applications to practical problems. Seven classes of circuit element have been defined, as follows:

SENSE elements test a particular characteristic of a data word and produce one of two control outputs according to whether the result of the test was true or false.

OPERATOR elements perform arithmetic or logical operations on a pair of data inputs and produce a data word.

COMPARISON elements combine several sensing and operator functions in a single element to accomplish frequently used data classification operations.

TRANSFER elements bring data in and out of the circuit from files in memory and from external devices.

SWITCHING elements set and read flags, index a series of data words, branch a succession of data signals to a series of alternate branches, and perform other similar functions.

INTEGRATING elements, which are in effect complex operator elements, collect the sum or product of repeated operations on two variables.

ROUTING elements combine, split, and gate the flow of data control signals, and provide the linkage between the program block represented by a given data flow circuit and other program blocks (circuits) constituting the overall program. Some routing elements do not themselves produce program instructions, but rather modify those produced by the functional elements to which they are connected.

Although these circuit elements are the best mode contemplated, other circuit elements may be formulated for use so long as they maintain the basic characteristics, i.e., they accurately show data flow and are directly convertible to machine instructions or circuit hardware to permit precise time and core equivalency.

Table 1 lists the elements presently defined for initial use in the Graphical Automatic Programming Method (GAP). These include four SENSE elements, eleven OPERATOR elements, six COMPARISON elements, six TRANSFER elements, fourteen ROUTING elements, three SWITCHING elements, and six INTEGRATING elements. Others found to be widely applicable may be added to the basic vocabulary for general use. Facility will be provided for each designer to define for his own use special-purpose functions as auxiliary elements. Most of these can be built up from combinations of the basic elements, as is true of the COMPARISON elements already defined.

TABLE 1

| DATA FLOW CIRCUIT ELEMENTS | |
| --- | --- |
| SENSE ELEMENTS | TRANSFER ELEMENTS |
| BRANCH ON ZERO | READ WORD |
| BRANCH ON PLUS | WRITE WORD |
| BRANCH ON MINUS | READ FILE |
| BRANCH ON CONSTANT | WRITE FILE |
| | FUNCTION TABLE |
| OPERATOR ELEMENTS | INPUT DATA |
| ADD | OUTPUT DATA |
| AVERAGE | |
| MULTIPLY | ROUTING ELEMENTS |
| SUBTRACT | LINKAGE DATA |
| DIVIDE | PASSIVE SPLIT |
| EXPONENTIATE | DATA SPLIT |
| AND | CONTROL SPLIT |
| INCLUSIVE OR | LINKAGE EXIT |
| EXCLUSIVE OR | PASSIVE JUNCTION |
| MINIMUM | DATA JUNCTION |
| MAXIMUM | CONTROL JUNCTION |
| | LINKAGE STORE |
| COMPARISON ELEMENTS | DATA GATE |
| BRANCH ON COMPARE | DATA PACK |
| BRANCH ON GREATER | LINKAGE ENTRY |
| BRANCH ON UNEQUAL | DATA LOOP |
| CORRELATE | CONTROL LOOP |
| THRESHOLD | |
| RANGE GATE | SWITCHING ELEMENTS |
| | STORE BRANCH |
| | READ BRANCH |
| | INDEX DATA |
| | INTEGRATING ELEMENTS |
| | SUM ADD |
| | SUM MULITPLY |

Figure 3:
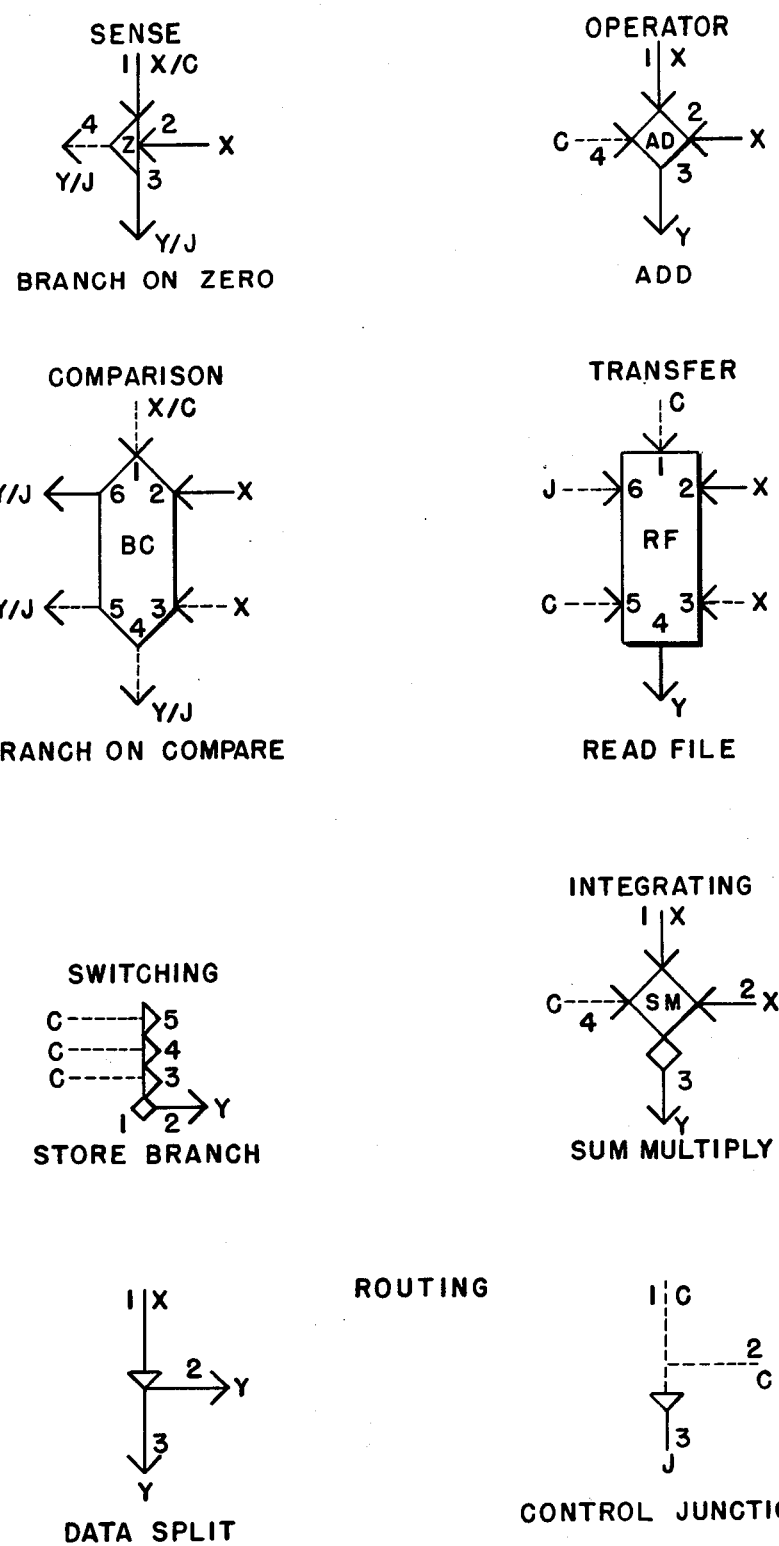
FIG. 3 is a multi-part diagram showing examples of data circuit elements.

TABLE 1-continued
DATA FLOW CIRCUIT ELEMENTS
SUM DIVIDE
SUM EXPONENTIATE
PRODUCT ADD
PRODUCT EXPONENTIATE FIG. 3 illustrates the symbolic representation of typical circuit elements. The top rows picture one element of each of the four main functional groups, while the bottom rows illustrate four ROUTING elements. As noted previously, solid lines are used for data signals and dashed lines for control signals.

In FIG. 3 the sample elements are seen to have the following types and numbers of connections:

| Element Type | Name | Data Inputs | Control Inputs | Data Outputs | Control Outputs |
|---|---|---|---|---|---|
| SENSE | BRANCH ON ZERO | 1-2 | 1-0 | 0-2 | 2-0 |
| OPERATOR | ADD | 2 | 1 | 1 | 0 |
| COMPARISON | BRANCH ON COMPARE | 2-3 | 1-0 | 0-3 | 3-0 |
| TRANSFER | READ FILE | 2 | 2 | 1 | 1 |
| SWITCHING | DATA SPLIT | 1 | 0 | 2 | 0 |
| INTEGRATING | CONTROL JUNCTION | 0 | 2 | 0 | 1 |
| ROUTING | STORE BRANCH | 0 | 3 | 1 | 0 |
| | SUM MULTIPLY | 2 | 1 | 1 | 0 |

OPERATOR, COMPARISON, and TRANSFER elements are provided with an optional control input to serve as a gate for delaying the functioning of the element until the receipt of a control signal from elsewhere in the circuit. The READ FILE and DATA LOOP elements have a control input which serves a different purpose, namely to initiate the next cycle of the loop.

The maximum number of connections for any element is eight, and for SENSE and OPERATOR elements it is four. Connections are numbered clockwise with #1 at 12 o'clock.

The characteristics of Data Circuit Elements can best be described by examples. Three of these elements will be used in a simple circuit to illustrate the automatic translation of a data circuit into a computer program. The detailed operation and equivalent code of four of the elements in FIG. 3, are described below.

The function of the BRANCH ON COMPARE element is to emit a control signal from one of its three output termimals in accordance with the relative magnitude of the two data inputs at terminals 2 and 3. As the signals in a data circuit flow from an output of one element to an input of another, one link at a time, the step when a given data element performs its function and generates an output occurs when the final input necessary for its operation arrives. In the case of the BRANCH ON COMPARE element in its basic ungated form, only the above two data inputs are required. When the first arrives it is put in a temporary memory location; when the second arrives, usually several steps in the transformation program later, the element functions and generates the appropriate output, which in this instance is a control output from terminal 4, 5 or 6 of the numbered connections of said COMPARE element.

In translating the functioning of the element into computer assembly code, the conditions at the time of functioning must be noted. In Appendix A is listed the assembly code equivalent to each of the commonly used data circuit elements in the assembly language of the Honeywell DDP-516 computer. The code labels used hereinbelow are entirely arbitrary. However, it will be convenient to relate them to the notation of the corresponding element input or output connections. When the BRANCH ON COMPARE element is activated by the arrival of the input at terminal 2, the corresponding data word is in a general register, designated AR, while the other data input is in a temporary memory location, labeled M3. The resulting code would have the form listed below for computers having a specific "Compare" instruction. The instructions in word form are listed in the left column and the equivalent instructions in assembly code for the conventional simple computer mentioned in connection with FIG. 1 are listed at the right.

| | | | |
|---|---|---|---|
| 1. | Compare AR with M3 | CAS | BC3 |
| 2. | Jump to M4 (if AR > M3) | JMP | BC4 |
| 3. | Jump to M5 (if AR = M3) | JMP | BC5 |
| 4. | Jump to M6 (if AR < M3) | JMP | BC6 |

Like most SENSE and COMPARISON elements, the BRANCH ON COMPARE element has a terminal 1 that can be used to switch a control or data signal to the particular output conditional on the relative magnitude of the data inputs at terminals 2 and 3. This connection saves the addition of several routing elements which would accomplish the same result.

The BRANCH ON COMPARE element also has another form in which there is a data input at terminal 1 while either terminal 2 or 3 is "shorted" to terminal 1. The element will behave as if the input at terminal 1 were also present at the shorted terminal, and hence switch the input accordingly. Since such simple variants of an element are distinguishable in the diagram by a simple notation at the shorted terminal, the same basic element can be used for several closely related functions without ambiguity. The READ FILE element has the function of extracting one or a series of data words from an array or file in memory. In its fully connected form it is designed to operate in a circuit "loop", extracting one word of a sequence at each turn until the file is empty. If the stepping control input at terminal 5 is designated as unconnected, the READ FILE element will extract a single data word from the core location designated by the sum of the inputs at terminals 2 and 3.

In the READ FILE element, the input required to generate the code is the control input at terminal 1. When this input arrives, the element reads out the data word located at the address indicated by the initial value of the index, i.e. the number of items in the file to be read out, which has been stored previously at the data input at terminal 2.

After the extracted word has been processed, a "stepping" control pulse is received at terminal 5. This input causes the index to step to the next word on the list. If the incremented value of the index shows that no words remain, a control output appears at terminal 6. If not, the next word is read out at terminal 4, initiating the next cycle of the loop.

The translation of the READ FILE element into assembly language is written in a single sequence of instructions as soon as the first word is read out. The differentiation between the initial and stepping modes is done by the use of labels which indicate the entry points for the two modes.

The code for the READ FILE element is shown below in its generalized form on the left and in conventional computer code on the right. The "IRS" instruction in the conventional code stands for "increment, replace, and skip" and has the function of incrementing the contents of the indicated memory location by one and skipping the next instruction if the result is zero. "SKP" is an unconditional skip instruction. The significance of the other instructions is obvious.

| 1. M5:Increment M2 | RF5:IRS RF2 |
| | SKP |
| 2. Jump to M6 if M2 = 0 | JMP RF6 |
| 3. M1:Load M2 into XR | RF1:LDX RF2 |
| 4. Load M3, X into AR | LDA RF3,1 |

M5 is the label of the jump instruction which provides the gating input to terminal 5. M1 is the label corresponding to the readout of the first word on the list. Thus, an instruction calling for a jump to M1 would result in the execution of instructions 3 and 4, and eventual return to the loop at instruction 1. M3, X stands for the X'th entry in the file whose base address is in M3, and where X is the contents of the index register.

The DATA SPLIT element stores a data input temporarily, and routes it to two other circuit elements. The data input is temporarily stored by the code:
1. Store AR in M1    STA DS1

The CONTROL JUNCTION routes several different control signals to a single element input. While it does not in general produce code, it does change the labels of jump instructions on the connected elements.

Data Preparation

The word length in most general-purpose computers varies between 12 and 36 bits. The accuracy with which a given variable is known is seldom greater than one part in 2000, which requires 11 bits plus 1 bit to designate sign. Often the accuracy of the data requires 8 bits or less. Since memory capacity is often a limiting factor in the performance of a computer as a system element, it is frequently necessary to combine or "pack" two or more variables into a single data word to economize on memory storage and access time. When an operation must be performed on a given variable, the latter must first be extracted from the data word and manipulated to adjust its sign bit and location to put it into proper form for the ensuing operation. The data preparation usually involves several mask, shift, and complement instructions.

In the Data Flow Circuit notation, such preparation is specified as a preliminary to the operation performed by each element. The format of each variable is also specified as part of the circuit definition. The manipulations involved in data preparation, which represent a major portion of the "housekeeping" labor in programming, are thereafter accomplished automatically along with the translation of the functional operations of the elements in the Data Circuit.

Application Of Computer Graphics To The Design of Data Flow Circuits

The second key element in the technique of Graphical Automatic Programming is the utilization of the newly available computer-driven displays to help the designer lay out a satisfactory Data Flow Circuit, and at the same time store in the computer a complete description of the circuit as drawn. This latter step lays the necessary foundation for automating the transformation of the Data Circuit directly into computer code. The net result is an enormous saving in time in the overall process of Data Flow circuit design, checkout, and translation.

The development of computer graphics terminals enables the engineer to use the computer without writing a computer program. An example of a modern graphics terminal is the IBM 2250, which can be driven by most of the IBM 360 computers. The display has a 10-in.×10-in. cathode-ray-tube screen, a typewriter keyboard, a set of special control keys, and a light pen for direct interaction between the display and the operator. The operator uses the light pen to indicate the point at which he wishes a line or other symbol to appear, or the symbol which he wishes to select, erase, or otherwise operate on as he may direct by the keyboard.

Graphics terminals have greatly broadened the utility of computers as direct aids to many human tasks. By enabling the operator to "talk" with pointers and English words rather than through an elaborate code, they are revolutionizing many tasks. For example, a computer program called "ECAP", together with a graphics terminal, enables an engineer to "draw" an electronic circuit on the face of the display, punch in the component values he wishes to try, and in a few moments it gives him the salient characteristics of the circuit. If these characteristics are outside the desired limits, the engineer can adjust component values, alter connections, insert or delete components, and get essentially instantaneous feedback of the effects on performance. This technique promises to shorten the time for circuit design drastically.

In the graphic display program for the design of electronic circuits, the available components are first displayed at the bottom of the screen. They are then located in the circuit by pointing in turn to the desired component and then to the desired location on the screen with the light pen. The scanning beam in the display recognizes the location of the light pen, associates it with the component, and positions it accordingly. Elements are connected by simply pointing the pen at each of the terminals to be joined.

The successful development of such a powerful technique for the design of electronic circuits suggested that computer graphics might equally help accomplish direct and real-time transformation of Data Circuits into computer routines. The programming of the computer to accomplish this is, of course, quite different from "ECAP," but the property of communication between the engineer and computer by means of symbols and light pen is the same.

The display of a Data Circuit is accomplished in the same general manner as that described above for conventional electronic circuits. The symbols used are those defined in FIG. 3 for the Data Circuit elements, with the appropriate character code specifying the member of the element class.

The GAP graphic display program is designed to fulfill the following functions:

1. To display the element symbols located by the designer, storing the location of all element connections.
2. To display the data and control connections between the elements, and any special notation entered by the designer, including data preparation.
3. To associate the linked elements into an "Interconnection Matrix."
4. To check for any obvious errors in the diagram and to signal them to the designer.
5. To interact with the designer in the later stages of program generation by displaying anomalies or altering the circuit as directed.

Example Of The Graphical Design Of A Data Flow Circuit

The following elementary process illustrates how a simple Data Flow Circuit would be designed.

Data Inputs:
1. A number of potential target returns or "hits" have been received by a radar during several dwells.
2. The Amplitude, A, and Range, R, of each hit have been encoded into a single word A, R.
3. The hits have been listed sequentially in a file.

Data Processing:
1. All hits whose amplitude equals or exceeds a certain threshold are to be retained and stored in another file for further processing.
2. Other hits are to be rejected.

Figure 4:
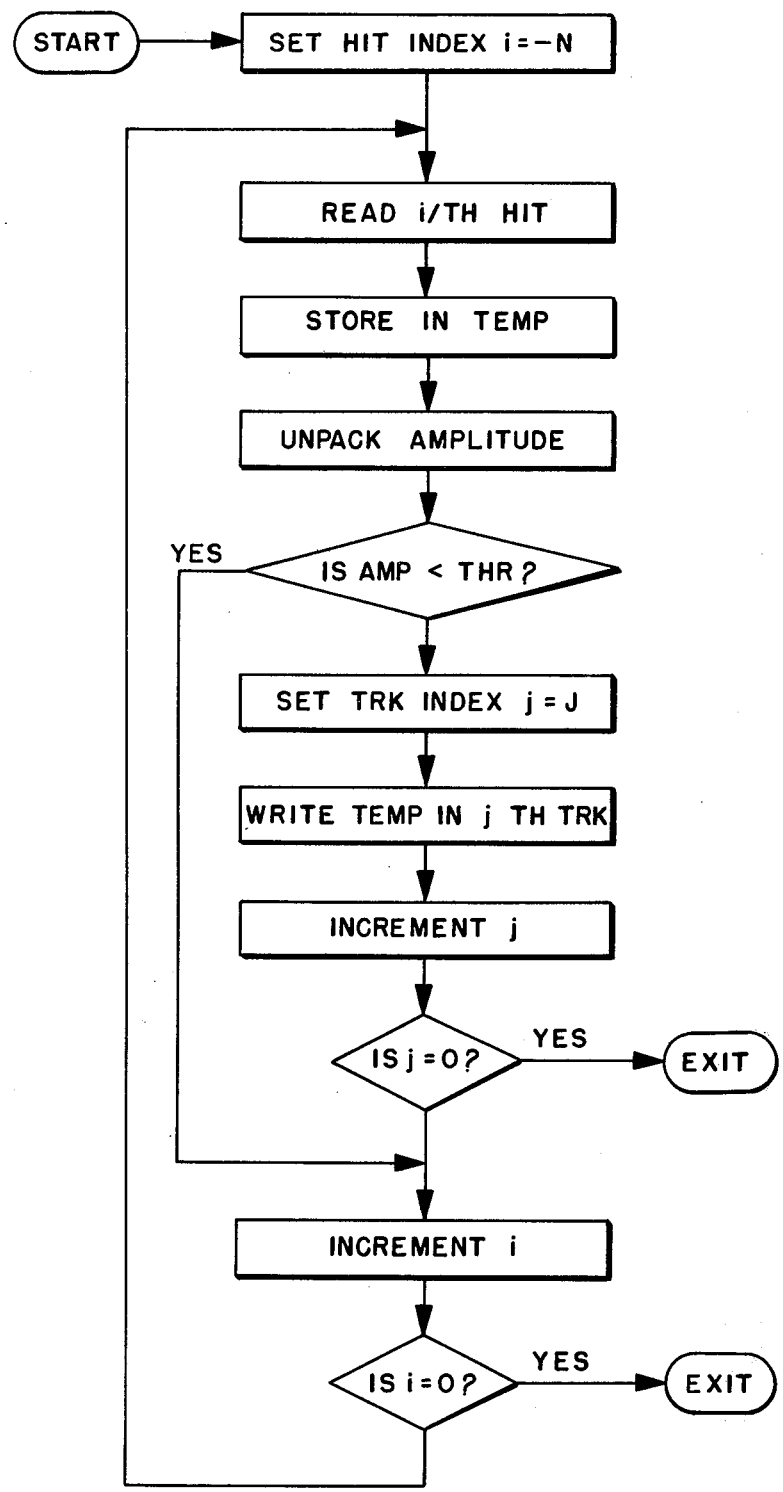
FIG. 4 is a conventional logic flow diagram illustrating the design of a simple data flow circuit.

The representation of this process in a conventional programmer's Logic Flow Diagram is shown in FIG. 4. In the figure, a potential target return is called a "HIT," and a return exceeding the threshold is called a "TRK," a mnemonic for "track." The diagram shows the steps required in indexing and the three decision branch points which occur when the amplitude is below the threshold or when either file is exhausted.

The representation of this data process in Data Flow Circuit language can be accomplished by the use of three functional elements.

1. READ FILE, to extract each hit from the hit entry file.
2. BRANCH ON GREATER, to select hits whose amplitude equals or exceeds the threshold.
3. WRITE FILE, to enter the selected hits into another file for retention.

The designer selects the READ FILE (RF) and WRITE FILE (WF) from the TRANSFER elements and positions them on the screen with the aid of a ¼ in. grid used during circuit assembly. If he wishes to use the basic form of the BRANCH ON GREATER (BG) element, he positions it to one side to provide the path for the hit selection logic. He then selects and locates the signal ROUTING elements and connects the element inputs and outputs with data (solid) or control (dashed) lines. The ROUTING elements required are a DATA SPLIT (DS) to route the extracted hit to both the BRANCH ON GREATER element and the WRITE FILE element, and a DATA GATE (DG) to pass the hit for entry only if the comparison shows that its amplitude passes the threshold. the partially completed circuit diagram is shown in FIG. 5a.

Figure 5A:
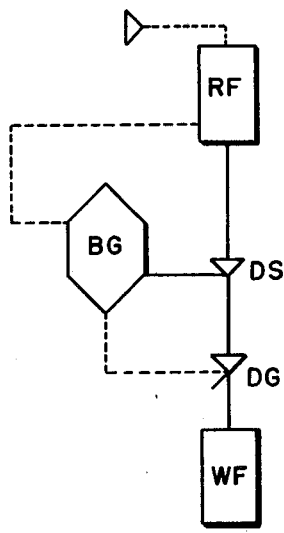
FIG. 5a is a diagram showing a partially completed circuit in data flow circuit language as it would appear on the screen of a graphics terminal; p
Figure 5B:
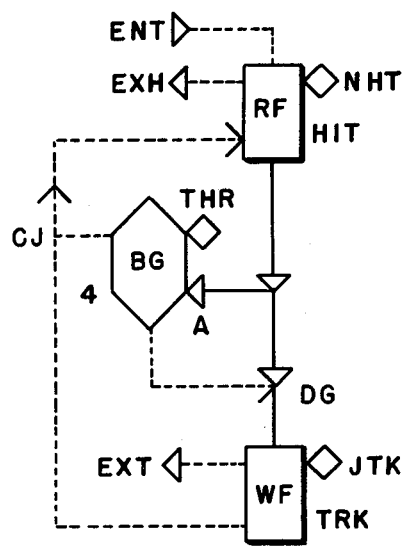
FIG. 5b is a diagram similar to FIG. 5a but showing a completed circuit.

The next step is to enter the arrows marking the input end of each connection, as well as other auxiliary labels and symbols (FIG. 5b). Where data inputs are to be stored in permanent memory locations, the input is indicated by a diamond with a symbol denoting the variable. Where a data input requires preparation, such as extracting the amplitude A from the hit word (R,A), the input arrow is closed into a triangle.

In order to help him remember the data and control inputs to the different elements, the designer may type in appropriate symbols on the keyboard and place them on the diagram by means of the light pen. In FIG. 5b the file names "HIT" and "TRK" are indicated on the RF and WF elements, as well as the number of his "NHT" and the number of empty spaces in the TRK file "JTK". The threshold and amplitude connections on the BG element are indicated by the symbols "THR" and "A," respectively. In representing the BRANCH ON GREATER element, which is a derivative of BRANCH ON COMPARE, the difference is depicted in the figure by locating a character '4' opposite terminal 5. This notation denotes that the output normally present at this terminal is "shorted" (combined) with the output of terminal 4.

FIG. 5b includes a passive CONTROL JUNCTION (CJ) element and a connecting link from it to the WF element that are not shown in FIG. 5a. FIG. 5b also shows terminals marked "EXH" and "EXT" (Exit) to the RF and WF elements. The appearance of these features illustrates how the GAP graphics program would discover formal errors or omissions by the designer in connecting the circuit elements. The computer examines each connection to see whether it has been assigned its proper function, i.e., data or control, input or output, and indicates omissions or incompatibilities by flashing or otherwise marking the connections involved. The designer would correct such errors before initiating the transformation of the circuit into computer code.

The data tables stored in the computer to generate the above circuit design on a terminal such as the IBM 2250 would then be converted by an automatic program into a table of logical connections represented by the circuit.

Element Interconnection Matrix

The information concerning the configuration of the data flow circuit entered by the designer is organized by the computer into a table which will be called the Element Interconnection Matrix. The matrix for the circuit described in FIG. 5a and 5b is shown in Table 2.

TABLE 2

| ELEMENTS | | | LINKAGES | | | | | | | TERMINALS |
|---|---|---|---|---|---|---|---|---|---|---|
| NAME | Ref. No. | Label | 1 | 2 | 3 | 4 | 5 | 6 | 7 | 8 1 2 3 4 5 6 7 8 |
| LINKAGE DATA | 0 | LD | | RF2 | RF3 | BG2 | WF2 | WF3 | LE1 | C Y Y Y Y Y J |
| LINKAGE ENTRY | 1 | LE | LD7 | RF1 | | | | | | C J |
| READ FILE | 2 | RF | LE2 | LD2 | LD3 | DS1 | CJ3 | LX1 | | C X X Y C J |
| BRANCH | 3 | BG | U | LD4 | DS3 | DG3 | '4' | CJ1 | | U X X J 4 J |

TABLE 2-continued

| ELEMENTS | | | ELEMENT INTERCONNECTION MATRIX | | | | | | | |
|---|---|---|---|---|---|---|---|---|---|---|
| | | | LINKAGES | | | | | | | TERMINALS |
| NAME | Ref. No. | Label | 1 | 2 | 3 | 4 | 5 | 6 | 7 | 8 1 2 3 4 5 6 7 8 |
| ON GREATER WRITE FILE | 4 | WF | DG2 | LD5 | LD6 | U | | CJ2 | LX2 | X X X U J J |
| DATA SPLIT | 5 | DS | RF4 | DG1 | BG3 | | | | | X Y Y |
| DATA GATE | 6 | DG | DS2 | WF1 | BG4 | | | | | X C Y |
| COLTROL JUNCTION | 7 | CJ | BG6 | WF5 | RF5 | | | | | C C J |
| LINKAGE EXIT | 8 | LX | RF6 | WF6 | | | | | | C C |

The first three columns contain the element name, reference number in the circuit, and label. The next six numbered columns are the labels of the connections of each respective terminal. Each terminal which is linked to another element in the circuit is labeled with the code and terminal number of that element. For example, the entry "DS1" in column 4 of row 3 means that terminal 4 of RF is linked to terminal 1 of DS. Since there may be several elements of a given type in a single circuit, in actual practice the labels would use the reference numbers instead of the element label. In the above example, the reference number "5" of the DS element would be used instead of the characters "DS".

It will be seen from Table 2 that three elements not shown in FIG. 5 appear in the element Interconnection Matrix. These are the three of the four Linkage routing elements, LINKAGE DATA (LD), LINKAGE ENTRY (LE), and LINKAGE EXIT (LX). Linkage elements are generally not displayed on a graphics terminal, since they represent non-functional interface terminals of the data flow circuit to other parts of the overall program. However, they are a necessary part of the circuit description and hence must be defined by the designer and incorporated into the Interconnection Matrix and thence transformed into computer code.

In addition to the entry of element interconnections, a separate list is entered of all "Data Prepare" operations. Also each output of a Linkage Data element, representing a file location, index, or reference word, must be defined in the Dictionary. In the above example, NHT, HIT, THR, JTK and TRK are so defined. In addition, connections of control inputs and outputs at LE and LX must be labeled to correspond to the designations of the corresponding linkages to other portions of the program. The Dictionary is used in the translation of the data flow circuit into computer code.

The last column of the matrix designated "Connections" indicates the type of each connection, namely:
X: Data Input
Y: Data Output
C: Control Input
J: Control Output
U: Unconnected The data in this column enable the program to make sure that an output always goes to an input and that each element has the appropriate type of connections.

Transformation Of Graphical Into Logical Form

The third key feature of Graphical Automatic Programming is the automatic transformation of the Element Interconnection Matrix, generated by the graphics terminal from the Data Flow Circuit, into the desired computer program. This requires the translation of the designated process represented by a two-dimensional circuit diagram into a one-dimensional sequence of computer instructions. The noteworthy facts are that this transformation can be done entirely automatically and that the resulting program is highly efficient in execution time and Core usage.

It will be recalled that in a Data Flow Circuit, as opposed to an ordinary digital circuit, signals flow in a succession of steps, each representing the transfer of a signal from an output of one element to an input of an adjoining element. The transformation of a Data Flow Circuit into an operational sequence involves putting these steps into an order which can be performed efficiently by a general-purpose computer. A set of rules produces a program that has high efficiency and is logically consistent.

The transformation procedure begins by initializing the data inputs entered from external memory locations specified in the Linkage Data element. It then proceeds to stack all but one of the external control entry inputs of the Linkage Entry element and examine the element to which this input is connected. The next and subsequent steps in the transformation program proceed in accordance with specific procedures for each element "Transformation Type". The different Transformation Types fall into four primary classes, as described in the first column of Table 3. Of these, the Branching and Joining types are seen from column two of Table 3 to be involved in switching or combining branches of different logical content. The Operating and Splitting types are involved in operation and distribution of data with the same logical content. The Joining and Splitting types involve only routing elements.

TABLE 3

| | ELEMENT TRANSFORMATION RULES | | |
|---|---|---|---|
| TRANSFORMATION TYPE | ELEMENT FUNCTION | TRANSFORMATION PROCEDURE | |
| | | FIRST INPUT | FINAL INPUT |
| BRANCHING | BRANCH SIGNAL PATH ACCORDING TO INPUT CONDITION(S) | STORE DATA INPUT(S) LINK NEXT SPLIT | WRITE ELEMENT CODE DEFER JUMP OUPUT(S) LINK TO IMMEDIATE OUTPUT |
| JOINING | JOIN TWO BRANCHES | JUMP FORWARD TO ADDRESS OF OUTPUT | WRITE ELEMENT CODE LABEL ADDRESS OF OUTPUT |

TABLE 3-continued
ELEMENT TRANSFORMATION RULES

| TRANSFORMATION TYPE | ELEMENT FUNCTION | TRANSFORMATION PROCEDURE | |
|---|---|---|---|
| | | FIRST INPUT | FINAL INPUT |
| OPERATING | OPERATE ON TWO OR MORE INPUTS TO FORM AN OUTPUT | LINK NEXT BRANCH STORE DATA INPUT(S) LINK NEXT SPLIT | LINK TO OUTPUT WRITE ELEMENT CODE LINK TO OUTPUT |
| SPLITTING | DISTRIBUTE SIGNAL TO TWO ELEMENTS | (ONLY ONE INPUT) | WRITE ELEMENT CODE DEFER ONE OUTPUT LINK TO OTHER OUTPUT |

In transforming the first two types of elements rules have been established to insure correct logical behavior. In transforming the second two, the rules insure efficient ordering of the operations to conserve execution time and memory usage.

The last two columns of Table 3 gives the Transformation procedures for two different input conditions of the element types. The first occurs with the arrival of an initial input preceding the arrival of the last one. The second occurs with the arrival of the final input necessary for the element to function. The writing of a general element code is seen to occur in the second step. The other steps result in signal routing operations.

The above rules apply to all elements except those members of the first two types which have a recycle mode. Examples of such elements are the READ FILE discussed previously and the DATA LOOP routing element. For these elements the procedure listed in the last column of Table 3 is used when the final input of the first cycle arrives. When the final input for the recycle mode arrives the procedure is to jump back to the labeled location of the feedback input and then to link the next branch.

In the table the term "next branch" refers to the last deferred jump output from a previously completed branching element. This order insures against jumping out of an incomplete loop. The "next split" refers to the last deferred output from a previously completed split element. The term "Link" specifies the element which is examined in the next step of the transformation.

The logic behind the Transformation Rules is the following:

1. Branching Elements

These elements serve to switch the sequence of operations into one of two or more alternative paths, each of a different logical content, depending on the conditions which determine this decision for the particular element. In terms of a computer program, which can process only one signal at a time, the branching must be accomplished by selecting one of the branches as the continuation of the main sequence, deferring the processing of the alternative branches until a suitable stopping point is reached in the main sequence. This is accomplished by writing a "Jump" instruction for each deferred branch with a designation to be specified later when the processing of that branch can resume.

2. Joining Elements

These elements serve to join two sequences of operation, or branches, with different logical content into a single sequence. The first sequence to arrive at a joining element must await further processing until the other sequence has reached the same point. This is accomplished by an unconditional "Jump" instruction at the end of the first sequence (input) to arrive. Following this point the sequence must shift to process the last branch output to be deferred. This order is necessary to insure against endless loops and other logical traps. When the last input arrives at the joining element, the operational sequence continues and the address of the junction is inserted as the destination of the jump instructions of the branch(es) which rejoin the main sequence.

3. Operating Elements

These elements serve to perform an operation on two or more data inputs to produce a single data output. The initial inputs are stored for later use, as in incomplete branching elements. The final input causes the operation characteristic of the element to be performed and the sequence of operations to continue to the element linked to the output. No change in logical content is involved.

4. Splitting Elements

These elements serve to split off a data or control signal from the main signal flow for later reference. This is done in the computer program in the case of data by storing the data in a temporary memory location which is accessed at a later time. In the case of a control signal this is done by storing a "flag" or jump location in a temporary memory store, which later directs the processing into a particular branch in the sequence of operations. In the transformation program the main operational sequence is deferred until the data or control flag is stored for later reference (as the input to the appropriate element). Provision is made against branching or joining the operational sequence while any deferred split outputs remain unprocessed, since the logical content must remain the same for all split outputs.

A detailed set of rules for transforming links to each different member or subclass of the form main transformation types is given in Appendix B.

Transformation Of A Data Flow Circuit

The applications of most of the above rules to the translation of a data circuit into computer instructions can be illustrated by proceeding step-by-step through the process on the very simple circuit described hereinabove.

Figure 6C:
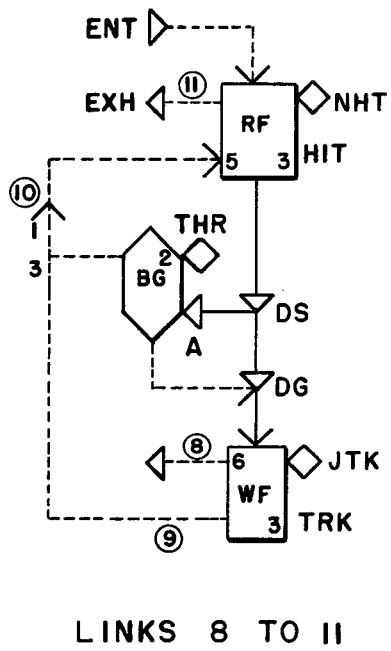
FIG. 6c is a diagram, also with an accompanying chart, showing the completion of the last four links of the transformation circuit.

By referring to FIG. 6a the first step of the transformation process will be seen. The process begins by tabulating and labeling the inputs and outputs connecting a circuit block to other blocks in the overall program. The external data inputs come from the LINKAGE DATA element, not shown. They are: two connections to files—HIT and TRK, and three data word inputs—the file indices NHT and JTK, and the threshold THR. There are three external control inputs and outputs, i.e., one enter, ENT, and two exits, EXH and EXT, located in the LINKAGE ENTRY and LINKAGE EXIT elements, not shown.

A section of the computer program is assigned to the definition of the labels used in the instruction code. This section, called the "Linkage" area, defines the labels used in referring to each external connection. The resulting assembly code, in the language of the Honeywell DDP-516 computer, is given in the top block at the right side of FIG. 6a. The instruction "DAC" stands for "Declare Address Constant" and serves to define the labels used in the assembly code for the circuit in terms of labels for variables and files defined for the overall program. The labels used for all memory locations are defined in terms of the elements connections, as used in the Element Interconnection Matrix (Table 2).

The linkage section will later be used to connect the circuit block to others in the program. Other circuit blocks may be in a different section of the computer memory, and in the prior art computer have to be addressed by the "indirect" memory address mode. An asterisk is used to indicate indirect addressing.

The listing of the external connections in the Linkage section produces one control output, namely from the ENT (enter) symbol to RF6. This and other outputs are listed in FIG. 6a at the right of the instruction block.

The first link to be made in the circuit is the connection of the above output to the READ FILE element. Since the index data input is already available in the Linkage, the RF element functions when the control input RF6 arrives. This step results in the following set of operations which transforms the circuit into computer code:
1. Write code for RF element in its gated form.
   defer branch output RF6.
   Proceed to output RF4.

In accordance with the transformation rules, the undeferred output, RF4, is chosen as link 2, the next step in the transformation. This, and the subsequent five steps in the transformation of the circuit are illustrated in FIG. 6b. The number of each output selected, the corresponding link formed in the circuit, and the resulting block of code are shown by a circled number. The Linkage section of code is not repeated, for the sake of brevity.

The arrival of the data input to the DATA SPLIT element in Step 2 causes it to function. This stores the input temporarily and produces two data outputs. The transformation results in the following operations:
2. Write code for DS element.
   Defer split output DS3.
   Proceed to output DS2.

The element connected to DS2, the DATA GATE element (DG), requires the presence of the control input as well as the data input in order to function. Since the former has not yet arrived and the latter is already stored in a temporary location, DS1, the completion of link 3 does not result in any code but merely the entry of the temporary store label DS1 into the input of the DG element, and hence the operation:
3. Change label on DG1 to DS1.

According to the transformation rules, the step following the input of a data signal into an incomplete Operator element is to operate on the deferred split output, DS3. This goes to the input of the BRANCH ON GREATER element in Step 2 in the transformation. This completes the inputs required for the BG element to function, and results in the operations:
4. Prepare input BG2.
   Write code for BG element.
   Defer branch output BG6.
   Proceed to output BG4.

The data input, BG2, has to be prepared by extracting the amplitude, A. This is accomplished by a logical "and" (ANA) masking operation, which is included in the first instruction of the block of code written for the BG element.

The next output to be transformed is the last deferred control output, BG6. In Step 5 this output provides one of the two necessary inputs to the CONTROL JUNCTION element, but results in no additional code since the jump instruction was written during the coding of the RF element in Step 2.

Output BG6, Step 6, completes the required inputs to the DATA GATE. This step results in the operations:
6. Write code for DG element.
   Proceed to output DG2.

Step 7 is to link data output DG2 to WF1, which causes the WF element to function. This results in the operations shown in the last block in FIG. 6b:
7. Write code for WF element.
   Defer control output WF6.
   Proceed to output WF5.

The final figure of the series, 6c, shows the completion of the last four links in the circuit. Output WF5 causes the CJ element to function. The functioning of the CJ element completes the link to RF and simply changes the labels on the control.

Element Operational Sequence—In FIG. 6 the Data Circuit was transformed directly into computer assembly code. In actual practice it is useful to divide this process into two steps.
1. Transformation of the Element Interconnection Matrix into an Operational Sequence.
2. Compilation of the Operational Sequence into Computer Code.

The first step is the really fundamental one, since it converts the two-dimensional matrix into a one-dimensional sequence. This is done by following the priority order of the circuit transformation rules. During this process some of the signal routing elements effectively disappear after establishing the sequence of operation of the functional elements and making direct interconnections among the functional elements themselves.

The result of this first step for the example discussed above is shown in Table 4.

TABLE 4

| ELEMENT OPERATIONAL SEQUENCE | | | | |
|---|---|---|---|---|
| Sequence Number | Reference Number | Element Label | Input Form | Input Terminal |
| 1 | 0 | LD | C | 1 |
| 2 | 2 | RF | C | 1 |
| 3 | 5 | DS | X | 1 |
| 4 | 3 | BG | X | 3 |
| 5 | 6 | DG | C | 2 |
| 6 | 4 | WF | X | 1 |

When Table 4 is compared with Table 2 it will be seen that the LE, CJ and LX elements have disappeared since their operation produces no new code.

In addition to producing the Element Operational Sequence the Transformation program lists any changes to be made in the input and output linkage entries of the functional elements as indicated by the transformation of the routing elements. For example, the output linkage of WF5 to CJ1 is altered to link directly to RF5 after the CJ element is transformed. Similarly, the program notes that the address of the data stored in DG1 is DS1.

Compilation Of Computer Code

The information generated by the transformation program, combined with that entered previously, together with equivalent element computer code as defined for each computer to be programmed, are sufficient to generate optimum assembly code. This may be done conveniently in two steps: The first is to assemble all of the information derived in the transformation program for each element in the operational sequence, and the second is to generate computer code for each element in turn by reference to the element code equivalents.

The assembly of information for each element is derived by collecting the pertinent data from the following lists:

1. Data Prepare List, with definition of each variable by reference to the Dictionary
2. Link Label List, which notes labels of inputs and outputs altered during the transformation program, as well as certain load, store or jump labels.

The compilation of code for each entry in the operational sequence then proceeds, by reference to equivalent code definition and to the interconnection matrix, by listing the code instructions equivalent to each of the following steps.

1. Preparation of input signals as directed by the Prepare List and Link Label List.
2. Operation of the element itself, including any prepare operations on stored inputs.
3. Preparation of output signals as in Item 1 above.

At the same time a list may be made of core usage and operating time for each entry in the operational sequence.

This process is seen to involve a mechanical substitution of the code for each element in the operational sequence, with due regard for the mechanics of storing and retrieving data from temporary stores as indicated by the notation in the connection field, and the conversion of label notation to suit the format of the specific computer code being written.

The compact and universal form of the Element Operational Sequence and associated data means that this intermediate step in program design can be used to check the program logic using any computer code, including the one which drives the interactive terminal, such as an IBM 360. Thus, compilation of the IBM 360 version of the code enables the immediate on-line test of the entire logical design of the circuit and of its transformation into the sequence of operations. If this is successful, the program logic can be considered "debugged" for all practical purposes, inasmuch as the conversion to the code for another computer involves no change in operational logic. This on-line debugging capability is an enormous advantage inherent in the use of the graphics or other interactive terminal to effect direct interaction with the computer. The program can then be automatically recompiled in the code of the specific computer for which it was designed.

Integration And Testing Of Complex Programs

A data-processing program for a large-scale system can be represented as a Data Flow Block Diagram, in which each block is an individual Data Flow Circuit. Each Circuit Block can be regarded as a special "Macro" Circuit element, with data and control signal inputs and outputs connecting it to other blocks which comprise the total program. The integration of Data Flow Circuits is readily accomplished by the use of the graphics terminal and a special Integration Program in a manner similar to that used in constructing the Data Flow Circuits. This program serves the purpose of a "Linkage Editor" in computer terminology.

Figure 7:
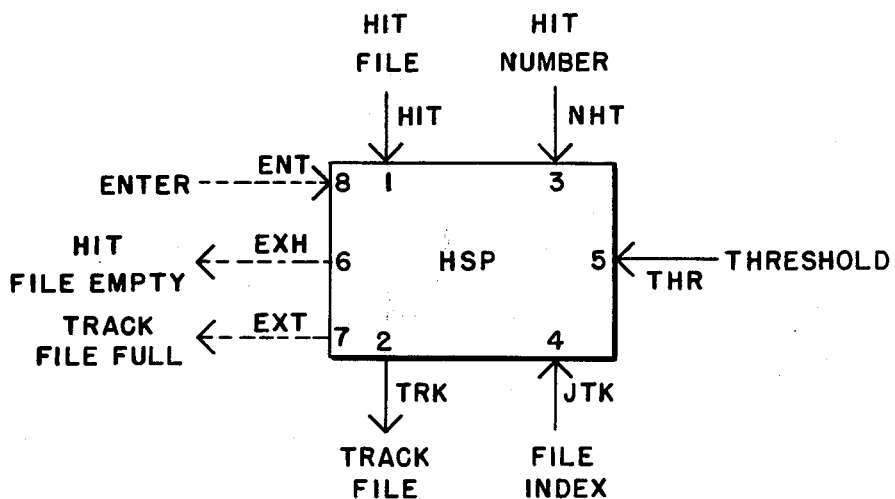
FIG. 7 is a diagrammatic representation of a data flow circuit as a program block.

The representation of a Data Flow Circuit as a Program Block is shown in FIG. 7, using the Hit Sorting Program as a simple example. It is seen that the block has 8 connections, namely 4 data inputs, 1 data output, 1 control input, and 2 control outputs. By reference to FIG. 6a it can also be seen that all of these connections are embodied in the Linkage Section of the code for the block. This section is equivalent to a terminal strip in a piece of electronic equipment.

The integration of program blocks into the total program may be simply done by drawing the program Block Diagram on the graphics display and making proper connections between the individual blocks. In such a diagram, it is important to keep all files external to the processing circuits.

Figure 8:
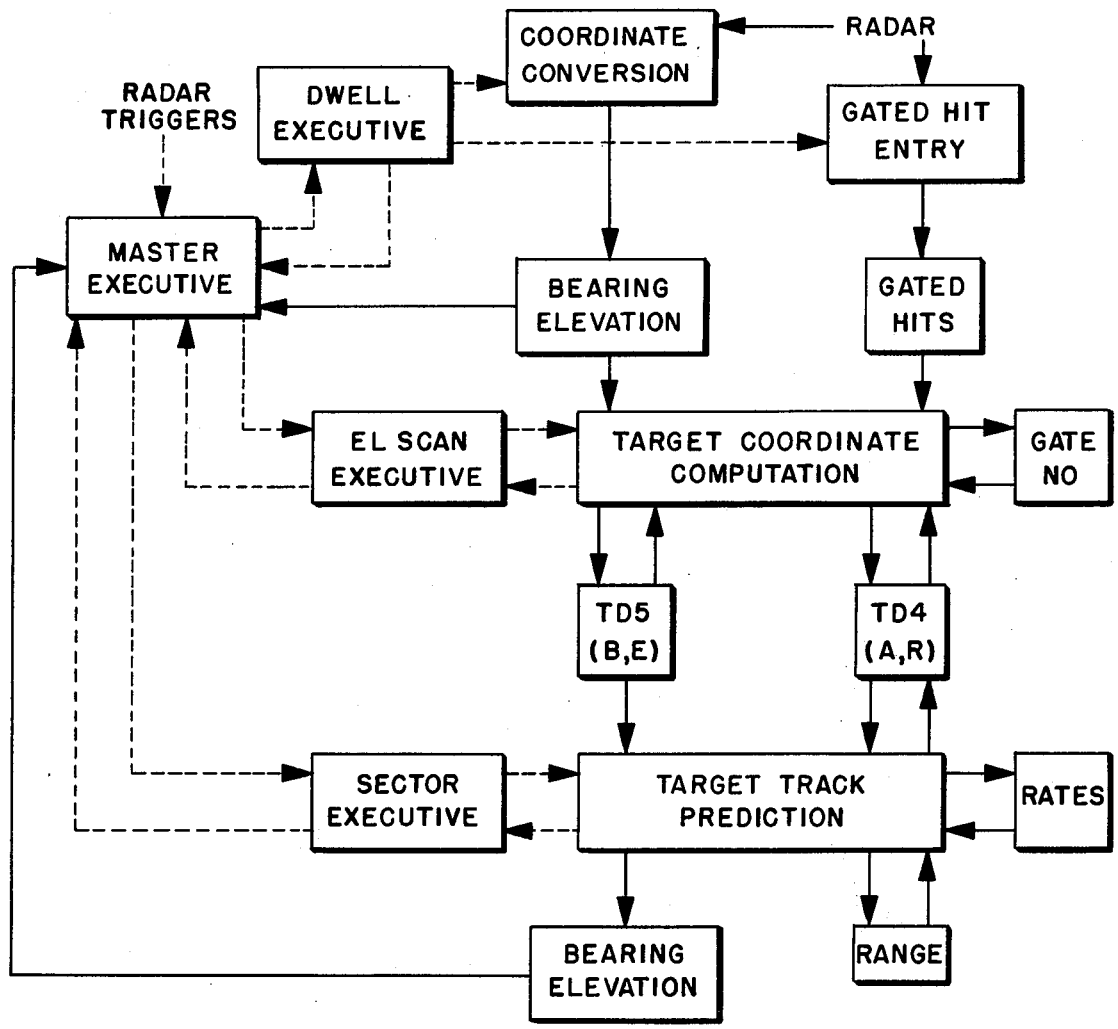
FIG. 8 is a block diagram representing the track prediction module of the 3D radar automatic tracking program used as an example in explaining the present invention.

An example of such a diagram is shown in FIG. 8, which represents the Track Prediction module of the 3D Radar Automatic Tracking Program. The program blocks are represented by rectangles and the data files by squares. The block illustrated in FIG. 2 is near the center of the diagram.

The very important function of synchronizing the operations of the program with the real-time schedule of radar transmission, elevation scanning, and rotation is accomplished by three "Executive" blocks supervised by a master Executive block. The Data Flow representation is ideally suited to visualize the detailed interactions between the high-priority, real-time functions and the supporting functions which may be accomplished with loose scheduling.

Figure 9:
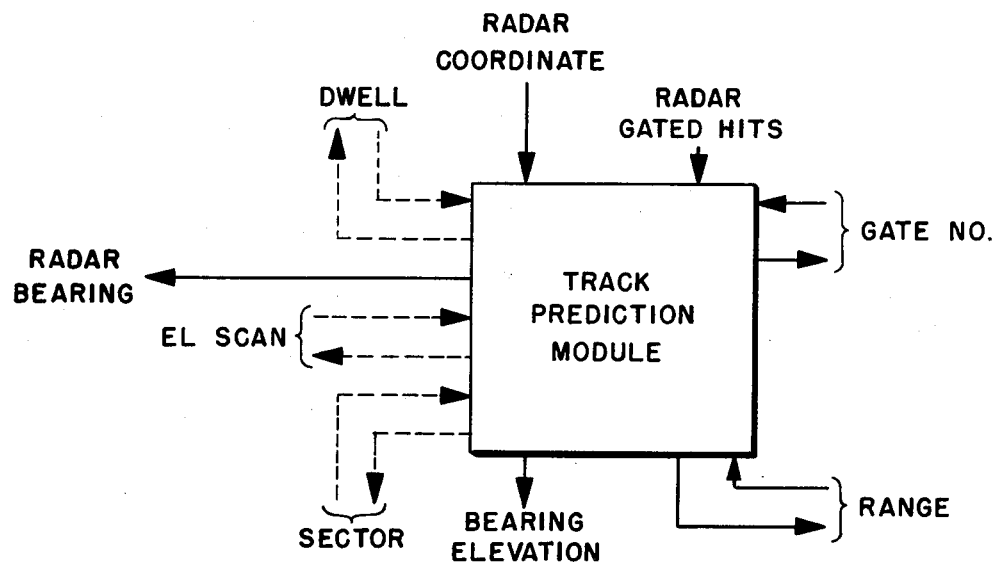
FIG. 9 is a diagram showing the transformation of the block diagram of FIG. 8 into a module for a complete program.

The transformation of the Block Diagram into computer assembly code involves only the proper correlation of the block linkage labels, where all inputs and outputs are listed. Since the module is itself a "block," as seen in FIG. 9, the next higher level of program integration is done in terms of entire modules rather than blocks. In this way an orderly and flexible format for the total program can be achieved.

Program Dictionary—The efficient management of the process of program design requires careful definition, organization, and maintenance of all terms used in the program. The list of these properties has to be assembled during the design process and, when complete, constitutes a basis for fully documenting the program and facilitating future changes.

The data required for this list include the code names, definitions, format, constituent parts, and cross-references of all of the following in a Program Dictionary:

1. Variables and constants
2. Data Files
3. Circuit Blocks
4. Modules

In addition, areas of memory must be allotted to store each of the above.

Once the above terms have been defined, their subsequent use requires only reference by code name. The computer automatically looks up the necessary characteristics in the Program Dictionary. This saves a great deal of housekeeping by the system designer, and should eliminate a major source of error.

Program Checkout—The most laborious and time-consuming part of programing is the elimination of errors, or "debugging". In this area Graphical Automatic Programming is likely to produce one of its greatest benefits in program design. The power of this technique to facilitate the production of a correct program stems from the following sources:

1. The Data Flow Circuit representation renders the pattern of data and logic flow highly visible and hence eliminates many errors at the source.

2. The entry of the Data Flow Circuit into the computer enables a virtually instantaneous check of any inconsistencies in the design by checking the Element Interconnection Matrix and monitoring its transformation into computer code.

3. The display of the circuit by a graphics terminal enables the designer to correct errors immediately by altering the circuit and verifying that the errors have been eliminated.

4. The GAP technique is ideally suited to rapid and thorough testing of the program at any desired level of realism. Thus, upon completion of a constituent circuit, the designer can test it by entering sample inputs and reading out the resulting outputs. He can also quickly design a test program in the form of another Data Circuit which would perform a realistic simulation of the program input and automatically compare the results with requirements.

A particularly important type of test that may be performed automatically is that of compatibility with real-time operation. Since the functioning of each element corresponds to a definite execution time in the computer to be employed, it is readily possible to have the test program simulate the execution time and monitor it against specified events.

Documentary Configuration of Data Flow Circuits

As described hereinabove, it is convenient in the design of GAP circuits on a graphics terminal to configure the Data Flow Circuit in a compact form to fit on the roughly square face of the display. This is also the form in which alternative parallel branches can best be represented, just as in conventional engineering circuit diagrams.

There are circumstances, however, in which the compact form of circuit representation is not the most advantageous. An important case is that of program documentation. For this purpose it is desirable to represent not only all of the data and control flow paths, but also the sequence in which the transformation program has arranged the functional branches of the circuit. It is also desirable to configure the circuit in a highly orderly and standardized manner, with maximum visibility of the course of each individual conditional branch and of each individual data variable.

Figure 10:
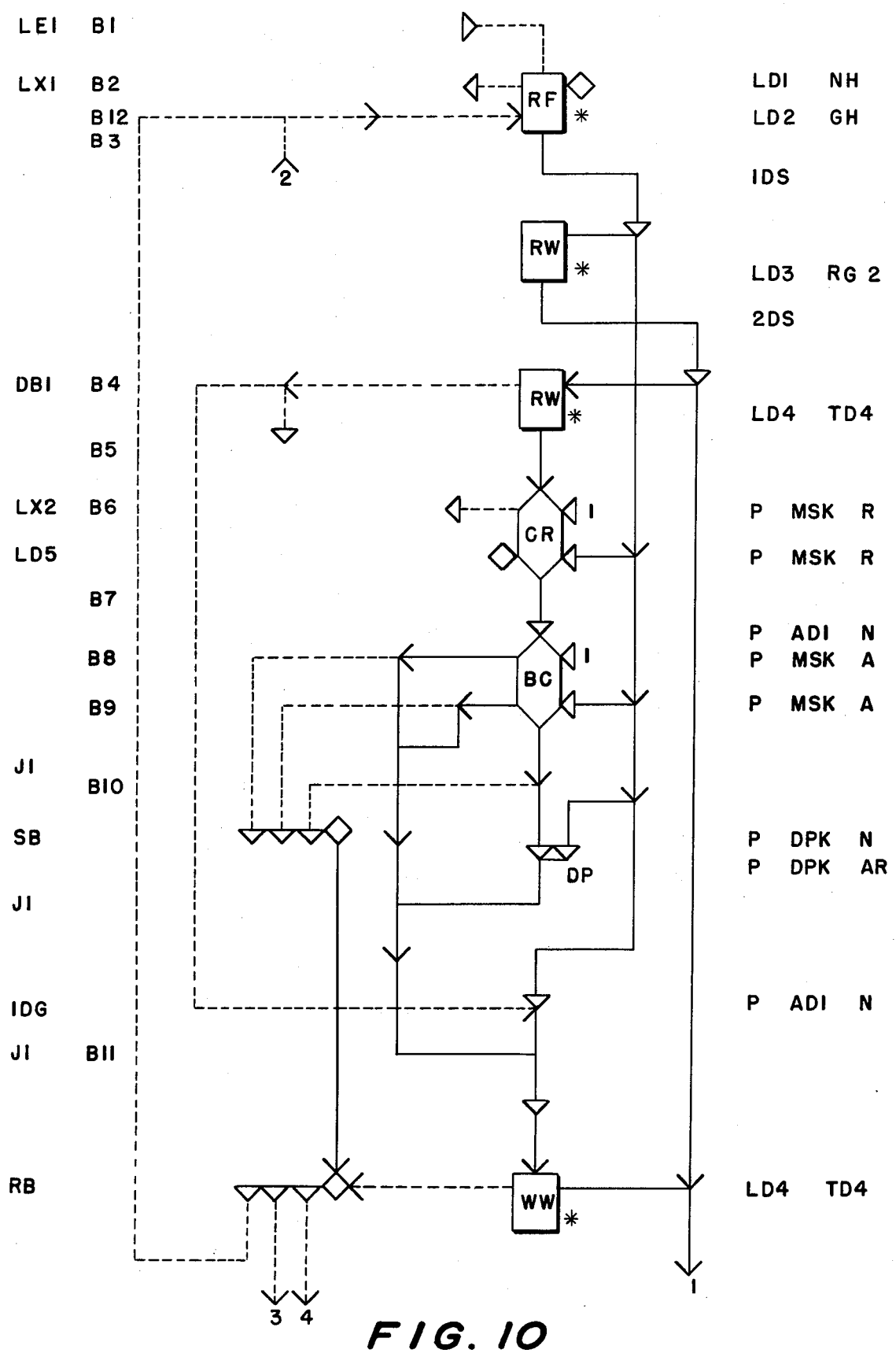
FIG. 10 is a diagram of the left hand portion of the circuit shown in FIG. 2, configured in a form especially suited to formally documenting the equivalent computer program, and facilitating subsequent modifications.

A modified representation satisfying the above requirements is shown in FIG. 10. It will be referred to as the "documentary" form, as opposed to the "compact" form. The circuit is identical in all respects to the left hand portion of FIG. 2. Its salient characteristics are as follows:

1. All functional elements are arranged in a central vertical column, in the operational sequence in which they are ordered by the transformation program.

2. Each data signal which is temporarily stored by a Data Split for distribution to two or more elements is routed along a vertical line on one side (to the right) of the central operational sequence.

3. Each branching signal is routed along a vertical line on the other side (to the left) of the operational sequence. Since the same signal path can carry both data and control logic, the lines on this side may be either solid or dotted.

4. Identification of linkage connections, prepare operations, branch numbers and other notation is carried in the margins and alongside the operational sequence.

Reference to FIG. 10 shows that there are several different types of branches represented on the left of the figure.

B1 is a Linkage Entry branch.
B2 and B6 are Linkage Exit branches.
B4, B8 and B9 are deferred conditional branches.
B11 is a deferred junctions.
B12 is a loop feedback.

It may, be seen that branches 4, 8, 9 and 10 are stored in the Store Branch (SB) element, and the identity of the stored branch carried by 11 to the Read Branch (RB) element which produces three corresponding branches after the Write Word Element functions.

The notation on the margin documents all Linkage inputs and outputs, and lists the assigned labels. In addition, the Prepare operations are identified. The ones shown perform the operations AD1 (add one), MSK (mask) and DPK (pack).

It is seen that this alternative form of the circuit lends itself to providing a more complete and formal description of all salient features of the circuit in a manner particularly easy to follow if changes (program patches) are made. It is also possible to inspect the logical consistency of the circuit at a glance. It is seen that no deferred branches cross one another or the loop feedback. It is also seen that all branches stored in the Store Branch element are joined in the Data Function preceding the Write Word element and are properly read out in the Read Branch element. In addition this form is especially convenient for listing the running times through the circuit.

The documentary form of the Data Flow Circuit may also be simulated on an alphanumeric terminal for purposes of documentation. This may be done in any one of a number of convenient ways, as for example where the elements may be indicated by their labels and terminal forms, and the connections only outlined. With this notation an ordinary typewriter terminal may be used to output a Data Flow Circuit for documentation purposes.

This more formalized notation may also be employed for designing programs on a common remote terminal. This process is more laborious than that employing a full graphics terminal with light pen, but is more widely available and considerably less expensive. For users not requiring a high program output, this type of terminal may well prove the most practical. The transformation program is accommodated in well under 4000 words (IBM CPS format), using disk files for reference data.

The documentary notation is also more similar to the logic diagram form familiar to programmers, and hence may be preferred by some users. The representation is of course also fully compatible with a graphics terminal.

Design Of Data Flow Circuits

The representation of data-processing operations in the Data Flow Circuit form has turned out to have all of the characteristics which were sought for in a basic language for the programming of real-time systems. For those interested in how a given program is translated by the designer into a Data Flow Circuit, the paragraphs below illustrate how one might design the circuit illustrated in FIG. 2.

The design of a particular Data Flow Circuit is best approached by constructing a "cause-effect table'-'—similar to a "truth table" or "decision matrix" in mathematical logic. This lists the possible combinations of input conditions and the corresponding outputs. For its application to the Target Coordinate Computation Circuit illustrated in the figure, the logic is as follows:

1. if no prior hit exists in the target data file (TD4), set number of hits =1 and store coordinates of new hit in target data files (TD4, TD5).

2. If previous hit exists, but does not coincide in range with new hit, exit to multiple target routine.

3. If previous hit correlates in range, increment number of hits, store target coordinates of strongest hit.

This leads to the following cause-effect table in which A is amplitude, $\Delta R$ is range increment within the gate, B is bearing, E is elevation.

| Conditions (Cause) | | | | | |
|---|---|---|---|---|---|
| Previous entry in TD4, (A, $\Delta R$) | None | Yes | Yes | Yes | Yes |
| $\Delta R$ of hit correlates with previous entry | — | No | Yes | Yes | Yes |
| Amplitude of hit compared to previous entry | — | — | Greater | Equal | Less |
| Actions (Effect) | | | | | |
| Number of hits | Set = 1 | — | Add 1 | Add 1 | Add 1 |
| Store in file TD4, (N,A,$\Delta R$) | New hit | — | New Hit | Previous hit | Previous hit |
| Store in file TD5, (B,E) | New hit | — | New hit | Average | — |
| Other | — | Exit | — | — | — |

From the cause-effect table it is evident that the following functional elements will be required.

1. READ FILE (RF) and WRITE FILE (WF) elements to read out data on new hits, previous entry, and to store updated coordinates.

2. CORRELATE (CR) element to check range correlation.

3. BRANCH ON COMPARE (BC) element to compare amplitude of new and previous hit.

4. AVERAGE (AV) elements to combine bearing and elevation for hits of equal amplitude.

The table also helps to arrange these operations in an efficient order in the circuit. It is evident, for example, that the range correlation check should be made before amplitude comparison.

With the aid of this type of logical organization, the layout of a Data Circuit such as the one shown in FIG. 2 folllows quite readily. The representation is intuitively easy to use by engineers, and makes it relatively simple to configure the routing elements to minimize the total number of instructions. For example, convergence of the data paths before storage of the updated coordinates is an obvious saving in code. This type of optiminization is made much more visible by the Data Circuit representation than by the conventional sequential logic approach.

The Data Circuit language thus makes it possible for an engineer to design the data flow process, in a form with which he is intuitively familiar, to achieve the best balance between operational requirements on accuracy, capacity, and timing within the limitations of available computer speed and size. The language is also directly interpretable by a programmer, so that even without the automatic features it bridges the communication gap which currently represents one of the greatest impediments to the economical design of system "software."

APPENDIX A

EQUIVALENT CODE FOR DATA CIRCUIT ELEMENTS INSTRUCTION FORMAT FOR HONEYWELL DDP-516

The tables in this Appendix give for the Data Circuit Elements the equivalent code in the assembly language of the Honeywell DDP-516 computer, as used in the text. Where an element has several forms in which it can be connected so as to vary its function in convenient ways but in a well defined and formal fashion, the code for each is listed at the right.

Under input conditions, the first entry is the last input to arrive. The second entry indicates where a given input is to be prepared before processing by the characters "pr" followed by the terminal number. For each such entry the instruction directly at the right is inserted in the code; otherwise the code skips the instruction. The characters "pr" in the code column stand for whatever DDP-516 code corresponds to the GAP prepare instruction.

The code is not repeated for similar members of the class, where the difference is so indicated.

| Element Name | Label | Form | Input Conditions | | Code |
|---|---|---|---|---|---|
| | | SENSE ELEMENTS | | | |
| BRANCH ON ZERO | BZ | CXJJ | C1 | | 1. LDA BZ2 |
| | | | | pr2 | 2. pr2 |
| | | | | | 3. SNZ |
| | | | | | 4. JMP BZ4 |
| | | XXYY | X1 | | 1. STA BZ1 |
| | | | | | 2. LDA BZ2 |
| | | | | pr2 | 3. pr2 |
| | | | | | 4. SNZ |
| | | | | | 5. RCB |
| | | | | | 6. LDA BZ1 |
| | | | | | 7. SSC |
| | | | | | 8. JMP BZ4 |
| | | X1YY | X1 | pr2 | 1. STA BZ1 |
| | | | | | 2. Go to 3 above |

-continued

SENSE ELEMENTS

| Element Name | Label | Form | Input Conditions | Code |
|---|---|---|---|---|
| | | | X1 | 1. SNZ |
| | | | | 2. JMP BZ4 |
| | | X1JJ | X1 pr1 | 1. pr1 |
| | | | | 2. SNZ |
| | | | | 3. JMP BZ4 |
| BRANCH ON PLUS | BP | Same except SMI for SNZ | | |
| BRANCH ON MINUS | BM | Same except SPL for SNZ | | |
| BRANCH ON CONSTANT | BK | Same except pr is SUB | | |

OPERATOR ELEMENTS

| Element Name | Label | Form | Input Conditions | Code |
|---|---|---|---|---|
| ADD | AD | XXYU | X1 pr2 | 1. pr1 |
| | | | pr2 | 2. IMA AD2 |
| | | | pr2 | 3. pr2 |
| | | | | 4. ADD AD2 |
| | | | X2 | Reverse labels 1 & 2 |
| | | XXYC | C1 | 1. LDA AD1 |
| | | | | 2. Go to 1 above |
| | | XXYJ | Same as above followed by | |
| | | | | 5. SRC |
| | | | | 6. JMP AD4 |
| AVERAGE | AV | Same as AD, plus | | 5. ARS =1 |
| MULTIPLY | MU | Same as AD except | | 4. MPY MP2 |
| SUBTRACT | SU | XXYU | X1 pr1 | 1. pr1 |
| | | | pr2 | 2. IMA SU2 |
| | | | pr2 | 3. pr2 |

-continued

OPERATOR ELEMENTS

| Element Name | Label | Form | Input Conditions | Code |
|---|---|---|---|---|
| | | | pr2 | 4. IMA SU2 |
| | | | | 5. SUB SU2 |
| | | | X2 pr2 | 1. pr2 |
| | | | | 2. IMA SU1 |
| | | | pr1 | 3. pr1 |
| | | | | 4. SUB SU2 |
| | | XXYC | C1 pr2 | 1. LDA SU2 |
| | | | pr2 | 2. pr2 |
| | | | | 3. Go to 2 above |
| | | | C1 | 1. LDA SU1 |
| | | | pr1 | 2. pr1 |
| | | | | 3. SUB SU2 |
| | | XXYJ | Same ending as AD | |
| DIVIDE | DV | Same as SU except DIV for SUB | | |

TRANSFER ELEMENTS

| Element Name | Label | Form | Input Conditions | Code | |
|---|---|---|---|---|---|
| READ FILE | RF | CXXYCJ | X1 | 1. RF5 | IRS RF2 |
| | | | | 2. | SKP |
| | | | | 3. | JMP RF6 |
| | | | | 4. RF1 | LDX RF2 |
| | | | | 5. | LDA RF3,1 |
| WRITE FILE | WF | XXXUJJ | X1 | 1. | IRS WF2 |
| | | | | 2. | SKP |
| | | | | 3. | JMP WF6 |
| | | | | 4. | LDX WF2 |
| | | | | 5. | STA WF3,1 |
| READ WORD | RW | CXXYUU | C1 | 1. | LDX RW2 |
| | | | | 2. | LDA RW3,1 |
| | | CXXYUJ | C1 | 1. | LDX RW2 |
| | | | | 2. | LDA RW3,1 |
| | | | | 3. | SNZ |
| | | | | 4. | JMP RW6 |
| WRITE WORD | WW | XXXUJU | X1 | 1. | LDX WW2 |
| | | XXXYUU | | 2. | STA WW3,1 |
| INPUT DATA | IN | CXUYUJ | C1 | 1. | INA IN2 |
| | | | | 2. | JMP IN6 |
| OUTPUT DATA | OT | XXUJUJ | X1 | 1. | OTA OT2 |
| | | | | 2. | JMP OT6 |

SWITCHING ELEMENTS

| Element Name | Label | Form | Input Conditions | Code | |
|---|---|---|---|---|---|
| STORE BRANCH | SB | UYCC | C2 | See CS | |
| READ BRANCH | RB | CXJJ | C1 | 1. | LDX RB2 |
| | | XXYY | | 2. | JMP RB1,1 |
| INDEX DATA | ID | CXYXX | C1 | 1. | LDX ID2 |
| | | | | 2. | LDA ID1,1 |

| INTEGRATING ELEMENTS | | | |
|---|---|---|---|
| SUM ADD | SA | Same as ADD, followed by | 5. STA SA3 |
| SUM MULTIPLY | SM | Same as MULTIPLY, followed by | 5. STA SM3 |
| SUM DIVIDE | SD | Same as DIVIDE, followed by | 6. STA SD3 |
| PRODUCT ADD | PA | Same as ADD, followed by | 5. MPY PA3 |
| | | | STA PA3 |

ROUTING ELEMENTS

| Element Name | Label | Form | Input Conditions | | Code |
|---|---|---|---|---|---|
| LINKAGE DATA | LD | CYYYYJ | C1 | 1. | LD2 DAC |
| | | | | 2. | LD3 DAC |
| | | | | 3. | LD4 DAC |
| | | | | 4. | LD5 DAC |
| PASSIVE SPLIT | PS | XYY | X1 | | None |
| DATA SPLIT | DS | XYY | X1 | 1. | STA DS1 |
| CONTROL SPLIT | CS | CJJ | C1 | 1. | LDA CS1 |
| | | | | 2. | STA CS2 |
| LINKAGE EXIT | LX | CC... | C | | None |
| | | XX... | X | | |
| PASSIVE JUNCTION | PJ | CCJ | C | | None |
| DATA JUNCTION | DJ | XXY | X1 | 1. | DJ1 |
| CONTROL JUNCTION | CJ | CCJ | C1 | 1. | CJ1 |
| LINKAGE STORE | LS | XX... | X | | None |
| DATA GATE | DG | XYC | C3 | 1. | DG1 LDS DG1 |
| DATA PACK | DP | XXXY | X1 pr1 | 1. | pr1 DP1 |
| | | | | 2. | STA DP1 |
| | | | | 3. | LDA DP2 |
| | | | pr2 | 4. | pr2 |
| | | | | 5. | STA DP2 |
| | | | | 6. | LDA DP3 |
| | | | pr3 | 7. | pr3 |
| | | | | 8. | ANA DP2 |
| | | | | 9. | ANA DP1 |
| LINKAGE ENTRY | LE | CJJ.. | C1 | | None |
| DATA LOOP | DL | XXYC | X1 | 1. | DL1 |
| CONTROL LOOP | CL | CCC | C1 | 1. | CL1 |

COMPARISON ELEMENTS

| Element Name | Label | Form | Input Conditions | | Code |
|---|---|---|---|---|---|
| BRANCH ON COMPARE | BC | CXXJJJ | C1 | 1. | LDA BC2 |
| | | UXXJJJ | U1 | 2. | CAS BC3 |
| | | | | 3. | JMP BC6 |
| | | | | 4. | JMP BC5 |
| | | XXXYYY | X1 | 1. | STA BC1 |
| | | | | 2. | LDA BC2 |
| | | | | 3. | CAS BC3 |
| | | | | 4. | JMP BCA |
| | | | | 5. | JMP BCB |
| | | | | 6. | LDA BC1 |
| | | | | 7. | JMP BC4 |
| | | | | 8. BCA | LDA BC1 |
| | | | | 9. | JMP BC6 |
| | | | | 10. BCB | LDA BC1 |
| BRANCH ON GREATER | BG | CXXJ4J | C1 | 1. | LDA BC2 |
| | | UXXJ4J | U1 | 2. | CAS BC3 |
| | | | | 3. | JMP BC6 |
| | | | | 4. | SKP |
| BRANCH ON UNEQUAL | BU | CXXJ4J | C1 | 1. | LDA BC2 |
| | | UXXJ4J | U1 | 2. | SUB BC3 |
| | | | | 3. | SZE |
| | | | | 4. | JMP BC6 |
| THRESHOLD | TH | XUXYUJ | X1 | 1. | SUB TH3 |
| | | | | 2. | SPL |
| | | | | 3. | JMP TH6 |
| CORRELATE | CR | XUXYXJ | X1 | 1. | SUB CR3 |
| | | | | 2. | SPL |
| | | | | 3. | TCA |
| | | | | 4. | SUB CR5 |
| | | | | 5. | TCA |
| | | | | 6. | SPL |

-continued

COMPARISON ELEMENTS

| Element Name | Label | Form | Input Conditions | Code |
|---|---|---|---|---|
| | | | 7. | JMP CR6 |

APPENDIX B

ELEMENT TRANSFORMATION PROCEDURES

| INPUT NO. | ELEMENT TYPE | DEFERRED LINK | NEXT LINK | SPLIT BRANCH PROCEDURE |
|---|---|---|---|---|
| Last | BRANCHING | BRANCH | ELEMENT OUTPUT | — |
| Any | PASSIVE JUCTION | — | ELEMENT OUTPUT | — |
| Last | ACTIVE JUNCTION | — | ELEMENT OUTPUT | STORE SEGMENT |
| First | ACTIVE JUNCTION | — | DEFERRED BRANCH | STORE SEGMENT |
| Last | OPERATIONAL | — | ELEMENT OUTPUT | — |
| — | PASSIVE SPLIT | SPLIT | ELEMENT OUTPUT | — |
| — | ACTIVE SPLIT | SPLIT | ELEMENT OUTPUT | — |
| First | OPER/BRANCH | — | DEFERRED SPLIT | END BRANCH |
| Any | STORE BRANCH | — | DEFERRED SPLIT | END BRANCH |
| STORE SEGMENT | PROCEDURE | NEXT BRANCH | DEFERRED SPLIT | — |
| END BRANCH | PROCEDURE | — | NEXT BRANCH | — |

Definition Of Terms

| | |
|---|---|
| LINK: | Signal flow between two active elements. |
| SEGMENT: | Continuous series of LINKS without nodes: i.e., split, combine or branch points. |
| BRANCH: | Connected tree of LINKS between branch points, i.e., with identical logical content. |
| DEFERRED LINK: | The procedure of saving one or more deferred outputs to be processed later. |
| NEXT LINK: | The initiation or source of the Link whose termination is the element to be transformed next. |
| SPLIT BRANCH PROCEDURE: | Name of procedure employed if transformation occurs while deferred split outputs remain. |

I claim:

1. A method of designing a computer program from a representation of the flow of data as a data flow circuit in a form directly analogous to an electronic circuit diagram, in which a computing machine performs machine functions in the design process in lieu of human mental steps in designing said computer program, which comprises the steps of:
   representing such program as a data flow circuit, and storing the data flow circuit in the memory of a general purpose digital computer,
   the representation making clear the operations to be performed by said computer on each data variable in said data flow circuit as well as showing conditional and unconditional logical branching in such circuit so that the method can be used to efficiently organize the operations and minimize redundancy therein.

2. The method of designing a computer program from a representation of the flow of data processed as a data flow circuit directly analogous to an electric circuit, in which a computing machine performs machine functions in the design process in lieu of human mental steps in designing said computer program, comprising the steps of
   developing such a data flow circuit for the data processed by graphics techniques wherein said data flow circuit is entered into the memory of a general purpose digital computer which has a stored program enabling said computer to respond to said graphics techniques,
   said computer having additional stored programs instructing it to visually represent the data flow circuit on a graphics terminal, transform said data flow circuit into an operational sequence and convert the operational sequence into assembly code for a second computer,
   and the step of utilizing the computer assembly code as a computer program for said second computer.

3. The invention of claim 2,
   including the additional step of checking the data flow circuit by using sample inputs and examining outputs.

4. The method of designing a computer program from a representation of the flow of data processed as a data flow circuit in a form directly analogous to an electric circuit, in which a computing machine performs machine functions in the design process in lieu of human mental steps in designing said computer program, which comprises the steps of
   storing in a general purpose digital computer the data flow circuit, the data flow circuit comprising a plurality of data processing elements representing operations equivalent to instructions in a second computer,
   storing in said general purpose digital computer instructions for producing configurations of said data processing elements together with instructions for processing a data flow circuit containing said configurations,
   producing on a terminal attached to said general purpose digital computer a data flow circuit from said stored element configurations, said general purpose digital computer having further stored programs for instructing it to convert the data flow circuit into an internal description of logical connections, convert said internal description of logical connections into a sequence of defined operations, and convert said sequence of operations into computer assembly code for said second computer.

5. The method recited in claim 4, wherein the assembly code is produce in real time on the general purpose digital computer, and including the additional step of testing the data flow circuit on said general purpose digital computer.

6. The method as recited in claim 4, wherein the step of producing a data flow circuit is accomplished on a graphics terminal, and including the additional step of displaying on the graphics terminal the results of such testing of the data flow circuit whereby said displayed results may be modified and reprocessed.

7. The method recited in claim 6, including the additional step of connecting a data flow circuit with other data flow circuits at the graphics terminal, and the step of converting the connected data flow circuits into computer assembly code.

8. A method of designing a computer program from a representation of the flow of data processed as a data flow circuit in a form directly analogous to an electric circuit, in which a computing machine performs machine functions in the design process in lieu of human mental steps in designing said computer program, comprising the steps of:

developing a data flow circuit for the data processed by terminal means wherein said data flow circuit is entered into the memory of a general purpose digital computer which has a stored program enabling said computer to respond to said computer terminal means, said computer having further stored programs instructing said computer to perform the following operations:

transforming the data flow circuit into an operational sequence representing the sequential action of the circuit elements as they would be serially processed by a computer, converting the operational sequence into computer assembly code, converting said operational sequence into a stored program for checking out the data flow circuit program logic by using sample inputs and examining the outputs, assembling the circuit with other blocks of the total program, and checking the program for proper operations.

9. The method of claim 8, wherein the terminal means is a graphics terminal having means for selecting, arranging and connecting the circuit elements of each data flow circuit for display and subsequent transformation and testing, and including the step of using a computer to drive the graphics terminal.

10. The method of claim 8, wherein the terminal means is an interactive alphanumeric terminal having means for selecting and connecting the circuit elements of each data flow circuit for subsequent automatic transformation and testing.

11. The method of claim 8, including the step of storing in the computer the data flow circuit description in an element interconnection matrix and in a data dictionary, and automatically checking the matrix for errors in said circuit element connections and circuit flow logic.

12. The method of claim 8, wherein the data elements process data words in the computer.

13. The method of claim 8, wherein the data flow circuit elements are characterized by an operation time in the computer equal to the actual time that electronic circuit elements of said computer expend in their operation to carry out the data function represented by said data circuit elements.

14. The method of claim 8, wherein said data circuit elements stored in the computer are characterized by a core equivalency equal to the actual amount of core that the data circuit elements use to carry out the data function represented by said data circuit elements.

15. The method of claim 8, wherein the computer is additionally programmed to arrange the data flow elements of a data flow circuit without altering any of the element interconnections in the sequence in which they are ordered by the transformation program, branching being individually displayed on one side of the main element sequence and data distribution being displayed on the other side of said main element sequence to provide formal documentation of the program derived from the data flow circuit.

16. The method recited in claim 8, including the additional step of utilizing the specific computer to control a utilization means.

17. The method recited in claim 8, including the additional step of utilizing the specific computer to control a radar system.

18. The method recited in claim 8, wherein the step of utilizing computer terminal means consists of employing a computer graphics terminal.

19. In combination with a specific computer, and utilization means connected to said specific computer, apparatus for producing a computer program, comprising, a general purpose digital computer having instructions stored therein representing a plurality of data processing elements, said set of instructions being oriented to controlling operations of said general purpose computer in a mode peculiarly incompatible with human operations, and a graphics terminal attached to said general purpose digital computer for visually displaying said data processing elements as a data flow circuit, said general purpose digital computer having a program instruction stored therein for converting the data flow circuit into an operational sequence and a program instruction stored therein for converting the operational sequence into computer assembly code for said specific computer.

20. The invention as recited in claim 19, wherein the utilization means comprises a radar system.

21. Apparatus for producing a computer program, which comprises the combination of a general purpose digital computer and a set of program instructions stored therein, wherein said set of instructions is oriented to controlling operations of said computer in a mode peculiarly incompatible with human operations,
    computer terminal means utilizing the general purpose computer for representing data circuit elements stored in said computer as a data flow circuit,
    said general purpose computer also having a stored instruction for converting the data flow circuit into an operational sequence,
    a second computer,
    said general purpose computer further having a stored instruction for converting the operational sequence into assembly code for the second computer,
    and utilization means connected to the second computer.

22. Apparatus as recited in claim 21 wherein the computer terminal means provides visual representation of the data flow circuit.

23. Apparatus as recited in claim 21,
    wherein the first-mentioned means is a graphics terminal.

24. Apparatus for producing a computer program, which comprises the combination of a general purpose digital computer and a set of program instructions stored in the computer, said set of instructions being oriented to controlling operations of said computer in a mode peculiarly incompatible with human operations,
    said set including instructions for representing a plurality of data circuit elements as a data flow circuit, instructions for executing a transformation program for converting the data flow circuit automatically into an operational sequence, instructions for converting the operational sequence into computer assembly code and instructions for converting the operational sequence into a set of program instructions for testing,
    and computer terminal means driven by the computer.

25. The apparatus recited in claim 24, wherein the data circuit elements comprise a plurality of principal classes, each performing a characteristic class of function and each having a characteristic visual form.

26. The apparatus recited in claim 25, wherein the classes of circuit elements include:
    sense elements for testing a particular characteristic of a data word for producing conditional branching of a control or data signal,
    operator elements for performing arithmetic or logical operations on a pair of data inputs to produce a data output,
    comparison elements for combining a plurality of sensing and operator functions in a single element to effect data classification operations,
    transfer elements for bringing data into and out of a data flow circuit,
    switching elements for carrying out general purpose signal switching and indexing functions,
    integrating elements for collecting the sum or product of repeated operations on two variables,
    and routing elements which distribute the flow of data and control signals and provide a linkage between a program block represented by a given data flow circuit and other program blocks constituting an overall computer program.

27. The apparatus recited in claim 24 wherein each data circuit element program instruction is characterized by a computer-independent transformation type which is used for automatically testing the logical consistency of its connection in a data flow circuit.

28. The apparatus recited in claim 24 wherein a set of machine instructions is provided for the data circuit elements of each specific computer for which a program is to be written.

29. The apparatus recited in claim 24, wherein each data circuit element is characterized by having a specific execution time and memory requirement 30. The invention of claim 24,
    wherein the computer terminal means is a graphics terminal.

31. Apparatus for producing a computer program, which comprises the combination of a general purpose digital computer and a set of program instructions stored therein, said set of instructions being oriented to controlling operations of said computer in a mode peculiarly incompatible with human operations,
    said set including instructions for representing a plurality of data circuit elements as a data flow circuit, instructions for executing a transformation program for converting the data flow circuit automatically into an operational sequence and instructions for converting the operational sequence into computer assembly code,
    a second computer,
    and a graphics terminal driven by the second computer from said set of program instructions.

32. Apparatus for producing a computer program, which comprises the combination of a general purpose digital computer and a set of program instructions stored therein, wherein said set of instructions is oriented to controlling operations of said computer in a mode peculiarly incompatible with human operations,
    said set including instructions for representing a data flow circuit as a plurality of data circuit elements, instructions for executing a transformation program for converting the data flow circuit automatically into an operational sequence and instructions for converting the operational sequence into computer assembly code,
    terminal means,
    and a second computer,
    said terminal means being driven by said first-mentioned computer or by said second computer.

33. The invention of claim 32,
    wherein said terminal means is a graphics terminal for visually representing the data flow circuit.

34. The invention of claim 32,
    wherein said terminal means is an interactive alphanumeric terminal having means for selecting and connecting the circuit elements of each data flow circuit for subsequent automatic transformation and testing.

* * * * *